United States Patent
Matsuo et al.

(10) Patent No.: US 7,440,663 B2
(45) Date of Patent: Oct. 21, 2008

(54) SINGLE-MODE OPTICAL FIBER

(75) Inventors: Shoichiro Matsuo, Sakura (JP); Hiroshi Kutami, Sakura (JP); Kuniharu Himeno, Sakura (JP); Hiroyuki Sawano, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 11/679,001

(22) Filed: Feb. 26, 2007

(65) Prior Publication Data

US 2007/0147756 A1    Jun. 28, 2007

Related U.S. Application Data

(63) Continuation of application No. PCT/JP2005/015293, filed on Aug. 23, 2005.

(30) Foreign Application Priority Data

Aug. 30, 2004   (JP)   ............................. 2004-250039
Oct. 8, 2004    (JP)   ............................. 2004-296369

(51) Int. Cl.
    *G02B 6/02*   (2006.01)
(52) U.S. Cl. ........................ 385/123; 385/124; 385/125; 385/126; 385/127
(58) Field of Classification Search .......... 385/123–127
    See application file for complete search history.

(56) References Cited

U.S. PATENT DOCUMENTS 6,925,239 B2 *   8/2005   Wang et al. .................. 385/127

7,164,832 B2 *   1/2007   Kumano ...................... 385/126
2003/0161600 A1   8/2003   Mukasa
2003/0210878 A1  11/2003   Kumano et al.
2004/0213531 A1  10/2004   Sasaoka

FOREIGN PATENT DOCUMENTS

| JP | 2618400 B2 | 6/1997 |
| JP | 2003-241000 A | 8/2003 |
| JP | 2004-38133 A | 2/2004 |
| JP | 2004-54151 A | 2/2004 |
| JP | 2004-101840 A | 4/2004 |
| JP | 2004-133373 A | 4/2004 |
| WO | WO 01/27667 A2 | 4/2001 |

OTHER PUBLICATIONS

Fumiaki Sato et al., "Hikari Access-Yo Shokei Mage Taiogata Hikari-Fiber", 2003, Nen IEICE Communication Society Taikai Koen Ronbunshu 2, Sep. 10, 2003, p. 349, lecture No. B-10-30.

(Continued)

*Primary Examiner*—Jennifer Doan
(74) *Attorney, Agent, or Firm*—Sughrue Mion, PLLC

(57) ABSTRACT

A single-mode optical fiber has a cut-off wavelength of 1260 nm or less, a zero-dispersion wavelength in the range of 1300 nm to 1324 nm, a zero-dispersion slope of 0.093 $ps/nm^2/km$ or less, a mode field diameter at a wavelength of 1310 nm in the range of 5.5 µm to 7.9 µm, and a bending loss of 0.5 dB or less at a wavelength of 1550 nm, the bending loss being produced when the fiber is wound around a 10-mm radius for 10 turns.

9 Claims, 8 Drawing Sheets

OTHER PUBLICATIONS

Itaru Sakabe et al., "Mage Ni Tsuyoi Hikari Fiber No Hikkikomikei Eno Tekiyo Kento", 2004, Nen, The Institute of Electronics, Information and Communication Engineers Sogo Taikai Koen Ronbunshu Tsushin 2, Mar. 8, 2004, p. 379, lecture No. B-10-8.

Yoshiaki Terazawa et al., "Shokei Mage Taiogata Access-Yo Single Mode Hikari-Fiber", SEI Technical Review, Sep. 2003, No. 163, pp. 1 to 4.

Masataka Ikeda et al., "Setsuzoku Sonshitsu Teigengata Teimage Sonshitsu Hikari-Fiber", 2004 Nen The Institute of Electronics, Information and Communication Engineers Sogo Taikai Koen Ronbunshu Tsushin 2, Mar. 8, 2004, p. 372, lecture No. B-10-1.

Matsuo, S. et al., Bend-Insensitive and Low-Splice-Loss Optical Fiber for Indoor Wiring in FTTH. Optical Fiber Communication Conference, 2004. OFC 2004, Feb. 2004, vol. 2, paper Th13.

Kentaro Ichii et al., "Mage Sonshitsu O Teigen Shita Tei OH-SMF (FutureGuide® -SR15E) no Tokusei", 2004 Nen The Institute of Electronics, Information and Communication Engineers Sogo Taikai Koen Ronbunshu Tsushin 2, Mar. 8, 2004, p. 373, lecture No. B-10-2.

Ikeda et al., "Low bending Loss Optical Fiber with Reduced Splice Loss", Technical Report of IEICE, vol. 103, No. 255, OCS2003-37-54 pp. 35-40 (2003).

Sato et al., "Small allowable bending radius type optical fiber for access networks", Collected Papers of Lectures of IEICE Society Conference, B-10-30 (2003).

Ikeda et al., "Low Bending Loss Optical Fiber with Reduced Splice Loss", Collected Papers of IEICE General Meeting 2004, B-10-1 (2004).

Sakabe et al., "Enhanced Bending Loss Insensitive Fiber and New Cables for CWDM Access Networks", Proceedings of the 53$^{rd}$ IWCS/Focus Conference pp. 112-118 (2004).

M. Ikeda et al., "Low bending loss optical fiber with reduced splice loss", Fujikura Giho, No. 105, pp. 6-10, 2003.

* cited by examiner

SINGLE-MODE OPTICAL FIBER

CROSS-REFERENCE TO RELATED APPLICATIONS

This is a Continuation Application of International Application No. PCT/JP2005/015293, filed on Aug. 23, 2005, which claims priority to Japanese Patent Application No. 2004-250039, filed on Aug. 30, 2004, and Japanese Patent Application No. 2004-296369, filed on Oct. 8, 2004, the contents of which are entirely incorporated herein by reference.

TECHNICAL FIELD

The present invention relates to a single-mode optical fiber (hereinafter, referred to as an SMF) that has chromatic dispersion characteristics equivalent to those of a related art SMF and that has a very small bending loss when bent around a small radius.

BACKGROUND ART

Developments of a transmission system and an optical fiber that use Wavelength Division Multiplexing (WDM) have been actively advanced with the objective of increasing the data transmission rate in backbone and/or long-distance systems. Characteristics such as suppression of the nonlinear and control of the chromatic dispersion effect have been demanded for optical fibers for WDM transmission. In recent years, fibers in which the dispersion slope is decreased for a system called metro (metropolitan area network) with a span of about several kilometers, or fibers that suffer virtually no loss increase due to the presence of a hydroxyl group (OH), are proposed.

On the other hand, when introduction of fibers to offices and homes (Fiber To The Home; FTTH) is taken into consideration, characteristics different from those for the above-described optical fibers for transmission are required. In the case of wiring the fibers in the building or the house, there is the possibility that a very small bending around a radius such as 15 mm or 10 mm occurs. Furthermore, when the extra length of the fiber is stored, it is very important that loss increase does not occur, even if the fiber is wound around a small radius. That is, it is a very important characteristic for the optical fiber for FTTH to be insensitive to a small-radius bend. The connectivity with optical fibers (many of which are SMFs for transmission at a normal wavelength, i.e., 1300 nm) used from the base station to the building or to the house is also an important point. From such viewpoints, many reports on and patent application of optical fibers with reduced bending loss have been made (for example, refer to Patent Documents 1 to 4 and Non-Patent Documents 1 to 5).

The following documents describe the related art for the current invention:
Patent Document 1: U.S. Patent Application Publication No. 2004/0213531
Patent Document 2: PCT International Publication No. WO 01/27667 pamphlet
Patent Document 3: Japanese Unexamined Patent Application, First Publication No. 2004-133373
Patent Document 4: Japanese Patent No. 2618400
Non-Patent Document 1: Ikeda et al., "Low Bending Loss Optical Fiber with Reduced Splice Loss," Technical Report of The Institute of Electronics, Information and Communication Engineers (IEICE), 103, 255, OCS 200343 (2003)
Non-Patent Document 2: Sato et al., "Optical Fiber Conforming to Small Bending Radius for Optical Access," Collected Papers of Lectures of IEICE Society Conference, B-10-30 (2003)
Non-Patent Document 3: S. Matsuo, et al., "Bend-insensitive and Low-splice-loss optical fiber for indoor wiring in FTTH", Technical Digest of OFC 2004, ThI3 (2004)
Non-Patent Document 4: Ikeda et al., "Low Bending Loss Optical Fiber with Reduced Splice Loss," Collected Papers of IEICE General Meeting 2004, B-10-1 (2004)
Non-Patent Document 5: I. Sakabe, et al., "Enhanced Bending Loss Insensitive Fiber and New Cables for CWDM Access Network," Proceedings of the 53rd IWCS, pp. 112-118 (2004)

In the current FTTH system, a Passive Optical Network (PON) that employs SMFs for transmission in the 1300-nm wavelength band is widely used.

However, these related art optical fibers have an allowable bending radius of about 30 mm. In the wiring of the fibers, close attention has been required to eliminate extra bending.

Recently, SMFs have been commercialized that have allowable bending radii down to 15 mm by reducing the mode field diameter (hereinafter, referred to as MFD) while maintaining chromatic dispersion characteristics that comply with ITU-T G.652 (hereinafter, referred to as G.652), the international standard for the SMF for the 1300-nm wavelength band. However, such optical fibers have a problem in that the bending loss suddenly increases with a bending radius of 15 mm or less. FIG. 1 is a graph exemplifying a bending radius dependence of the bending loss of an optical fiber with an allowable bending radius of 15 mm. As shown in FIG. 1, the optical fiber with the related art allowable bending radius of 15 mm suffers a sudden increase in bending loss when the bending radius falls below 10 mm.

For a wiring use in buildings and homes, there are cases where a bending radius of 15 mm or less is needed. The optical fibers proposed in the above-mentioned Patent Documents 1 to 3 and Non-Patent Documents 1 to 5 are assumed to be used in an environment in which a bending around a 15-mm radius or less may be applied. An optical fiber with enhanced bending characteristics generally has a longer zero-dispersion wavelength, and thus has a larger absolute value of the chromatic dispersion in the 1300-nm wavelength band, compared with the normal SMF. For example, Patent Document 1 shows an example in which the optical fiber with low bending loss disclosed therein has a chromatic dispersion of −4.6 to −10.7 ps/nm/km in the 1300-nm wavelength band. The absolute value of the chromatic dispersion of this related art optical fiber with low bending loss is large, compared with the fact that the chromatic dispersion in the 1300-nm band under G.652 is in the range of 0 to −2.2 ps/nm/km, when calculated by the definition of the zero-dispersion wavelength and the slope under G.652. However, the chromatic dispersion on this level has rarely posed a problem over a distance on the order of several tens of meters, such as in indoor wiring.

On the other hand, there is a need also for optical fibers for transmission lines to be resistant to bending loss when their handling in a cable or a closure box is taken into consideration. However, there are cases where the chromatic dispersion value of the low bending loss optical fiber shown in Patent Document 1 poses a problem when the fiber is used in the PON system. Under ITU-T G.983 or similar rules, in the PON system used for the FTTH service, the 1500-nm wavelength band is used for the transmission from the base station to the user, and the 1300-nm wavelength band is used for the transmission from the user to the base station. As for the light source for the 1300-nm wavelength band, an inexpensive Fabry-perot laser (hereinafter, referred to as FP laser) is widely used. Because the FP laser is based on multimode oscillation, the characteristics thereof are greatly affected by the chromatic dispersion value of the optical fiber that works as the transmission line. Current transmission apparatuses are designed with the chromatic dispersion characteristics of G.652 in mind. Therefore, there are cases where a large-absolute-valued chromatic dispersion value that the related art low bending loss fibers have is not preferable, because it may cause a communication failure.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

An object of the present invention is to provide an SMF with a very small bending loss while conforming to the characteristics defined under G.652.

To achieve the above-mentioned object, exemplary embodiments of the present invention provide an SMF, in which a cut-off wavelength is 1260 nm or less, a zero-dispersion wavelength is in the range of 1300 nm to 1324 nm, a zero-dispersion slope is 0.093 ps/nm²/km or less, an MFD at a wavelength of 1310 nm is in the range of 5.5 µm to 7.9 µm, and a bending loss that is produced when the fiber is wound around a 10-mm radius for 10 turns is 0.5 dB or less at a wavelength of 1550 nm.

In exemplary embodiments of the SMF of the present invention, it is preferable that the cut-off wavelength be any of a cable cut-off wavelength, a fiber cut-off wavelength, and a jumper cut-off wavelength.

In exemplary embodiments of SMF of the present invention, it is preferable that the chromatic dispersion value at a wavelength of 1550 nm be +18 ps/nm/km or less, and more preferably +17 ps/nm/km or less.

In exemplary embodiments of the SMF of the present invention, it is preferable that a Relative Dispersion Slope (RDS) defined by dispersion slope/chromatic dispersion value be in the range of 0.003 nm$^{-1}$ to 0.004 nm$^{-1}$ at a wavelength of 1550 nm.

In exemplary embodiments of the SMF of the present invention, it is preferable that a bending loss that is produced when the fiber is wound around a 10-mm radius for 10 turns be 0.1 dB or less at a wavelength of 1550 nm.

In exemplary embodiments of the SMF of the present invention, it is preferable that a bending loss that is produced when the fiber is wound around a 7.5-mm radius for 10 turns be 0.5 dB or less at a wavelength of 1550 nm. It is more preferable that a bending loss that is produced when the fiber is wound around a 5.0-mm radius for 10 turns be 0.5 dB or less at a wavelength of 1550 nm.

Exemplary embodiments of the SMF of the present invention preferably include a central core that has a radius $r_1$ and a refractive index $n_1$; an inner cladding that is provided around the outer circumference of the central core and has a radius $r_2$ and a refractive index $n_2$; a trench portion that is provided around the outer circumference of the inner cladding and has a radius $r_3$ and a refractive index $n_3$; and an outer cladding that is provided around the outer circumference of the trench portion and has a radius $r_4$ and a refractive index $n_4$, with a refractive index profile in which the refractive indices of the individual portions satisfy $n_1 > n_4 \geq n_2 > n_3$.

In exemplary embodiments of the SMF with the trench portion, it is preferable that with reference to the refractive index $n_4$ of the outer cladding, a relative refractive index difference $\Delta_1$ of the central core, a relative refractive index difference $\Delta_2$ of the inner cladding, and a relative refractive index difference $\Delta_3$ of the trench portion satisfy the following conditions:

$$0.40\% \leq \Delta_1 \leq 0.85\%$$

$$-0.20\% \leq \Delta_2 \leq 0.00\%$$

$$-1.0\% < \Delta_3 < \Delta_2.$$

In exemplary embodiments of the SMF with the trench portion, it is preferable that a radius $r_1$ of the central core, a radius $r_2$ of the inner cladding, and a radius $r_3$ of the trench portion satisfy the following conditions:

$$1.5 < r_2/r_1 < 3.0$$

$$0.5 < (r_3 - r_2)/r_1 < 3.0.$$

In exemplary embodiments of the SMF with the trench portion, it is preferable that the radius $r_3$ of the trench portion be in the range of 6 µm to 20 µm.

In exemplary embodiments of the SMF with the trench portion, it is preferable that a radius $r_4$ of the outer cladding be in the range of 28 µm to 64 µm.

Exemplary embodiments of the SMF of the present invention preferably include a central core that has a radius $r_1$ and a refractive index $n_1$; an inner cladding that is provided around the outer circumference of the central core and has a radius $r_2$ and a refractive index $n_2$; and an outer cladding that is provided around the outer circumference of the inner cladding and has a radius $r_4$ and a refractive index $r_4$, the SMF having a W-shaped refractive index profile in which the refractive indices of the individual portions satisfy $n_1 > n_4 > n_2$.

In exemplary embodiments of the SMF with the W-shaped refractive index profile, if a relative refractive index difference of the central core is $\Delta_1$ and a relative refractive index difference of the inner cladding is $\Delta_2$ with reference to the outer cladding, it is preferable that the following conditions be satisfied:

$$0.42\% \leq \Delta_1 < 0.85\%$$

$$1.5 \leq r_2/r_1 \leq 5.0$$

$$-1.0\% \leq \Delta_2 \leq -0.05\%.$$

In exemplary embodiments of the SMF with the W-shaped refractive index profile, if $y = (r_2/r_1) \cdot |\Delta_2|$, it is preferable that the following conditions be satisfied:

$$1.4 \cdot \Delta_1 - 0.8 \leq y \leq 1.4 \cdot \Delta_1 - 0.05$$

$$y \geq 0.075\%.$$

In exemplary embodiments of the SMF with the W-shaped refractive index profile, it is preferable that the radius $r_2$ of the inner cladding be in the range of 4.5 µm to 16 µm.

In exemplary embodiments of the SMF with the W-shaped refractive index profile, it is preferable that the radius $r_4$ of the outer cladding be in the range of 28 µm to 64 µm.

Exemplary embodiments of the SMF of the present invention have the following characteristics: a cut-off wavelength is 1260 nm or less; a zero-dispersion wavelength is in the range of 1300 nm to 1324 nm; a zero-dispersion slope is 0.093 ps/nm²/km or less; an MFD at a wavelength of 1310 nm is in the range of 5.5 µm to 7.9 µm; and a bending loss that is produced when the fiber is wound around a 10-mm radius for 10 turns is 0.5 dB or less at a wavelength of 1550 nm. Therefore, exemplary embodiments of the present invention can actualize an SMF with a very small bending loss while conforming to the chromatic dispersion characteristics defined under G.652.

BRIEF DESCRIPTION OF THE DRAWINGS

The above and other aspects of the present invention will become more apparent from the following detailed description of exemplary embodiments with the accompanying drawings, in which.

DETAILED DESCRIPTION OF EXEMPLARY EMBODIMENTS OF THE INVENTION

Exemplary embodiments of the SMF of the present invention have the following characteristics: a cut-off wavelength is 1260 nm or less; a zero-dispersion wavelength is in the range of 1300 nm to 1324 nm; a zero-dispersion slope is 0.093 ps/nm²/km or less; an MFD at a wavelength of 1310 nm is in the range of 5.5 μm to 7.9 μm; and a bending loss that is produced when the fiber is wound around a 10-mm radius for 10 turns is 0.5 dB or less at a wavelength of 1550 nm.

Furthermore, the cut-off wavelength of the low bending loss SMF of exemplary embodiments of the present invention is defined by the cable cut-off wavelength, the fiber cut-off wavelength, or the jumper cut-off wavelength, according to the conditions of use of the fiber. Measurement methods for each of the cut-off wavelengths are defined under ITU-T G. 650.1, "Definitions and test methods for linear, deterministic attributes of single-mode fibre and cable."

In the low bending loss SMF of exemplary embodiments of the present invention, it is preferable that the chromatic dispersion value at a wavelength of 1550 nm be +18 ps/nm/km or less. G.652 lists 17 ps/nm/km as the typical value for the chromatic dispersion value at a wavelength of 1550 nm. When the chromatic dispersion value shows a much larger value than this, it is not preferable from a viewpoint of transmission line design.

Furthermore, in the low bending loss SMF of exemplary embodiments of the present invention, it is preferable that an RDS at a wavelength of 1550 nm be in the range of 0.003 nm$^{-1}$ to 0.004 nm$^{-1}$. This RDS is a parameter defined as (dispersion slope)/(chromatic dispersion value), and is an indicator for determining the matching between a dispersion compensating fiber and a dispersion compensated fiber. The RDS of the optical fiber defined under the current G.652 (hereinafter, referred to as G.652 fiber) is about 0.0032 nm$^{-1}$. When a high-speed, long-distance transmission is performed, a dispersion compensating fiber is indispensable. If the optical fiber has the same RDS as the G.652 fiber, which is currently in wide use, it is possible to compensate the chromatic dispersion of the fiber using the dispersion compensating fiber for the G.652 fiber. In the SMF of exemplary embodiments of the present invention, a dispersion compensating fiber for the G.652 fiber can be utilized if the RDS thereof is in the range of 0.003 nm$^{-1}$ to 0.004 nm$^{-1}$.

Figure 3:
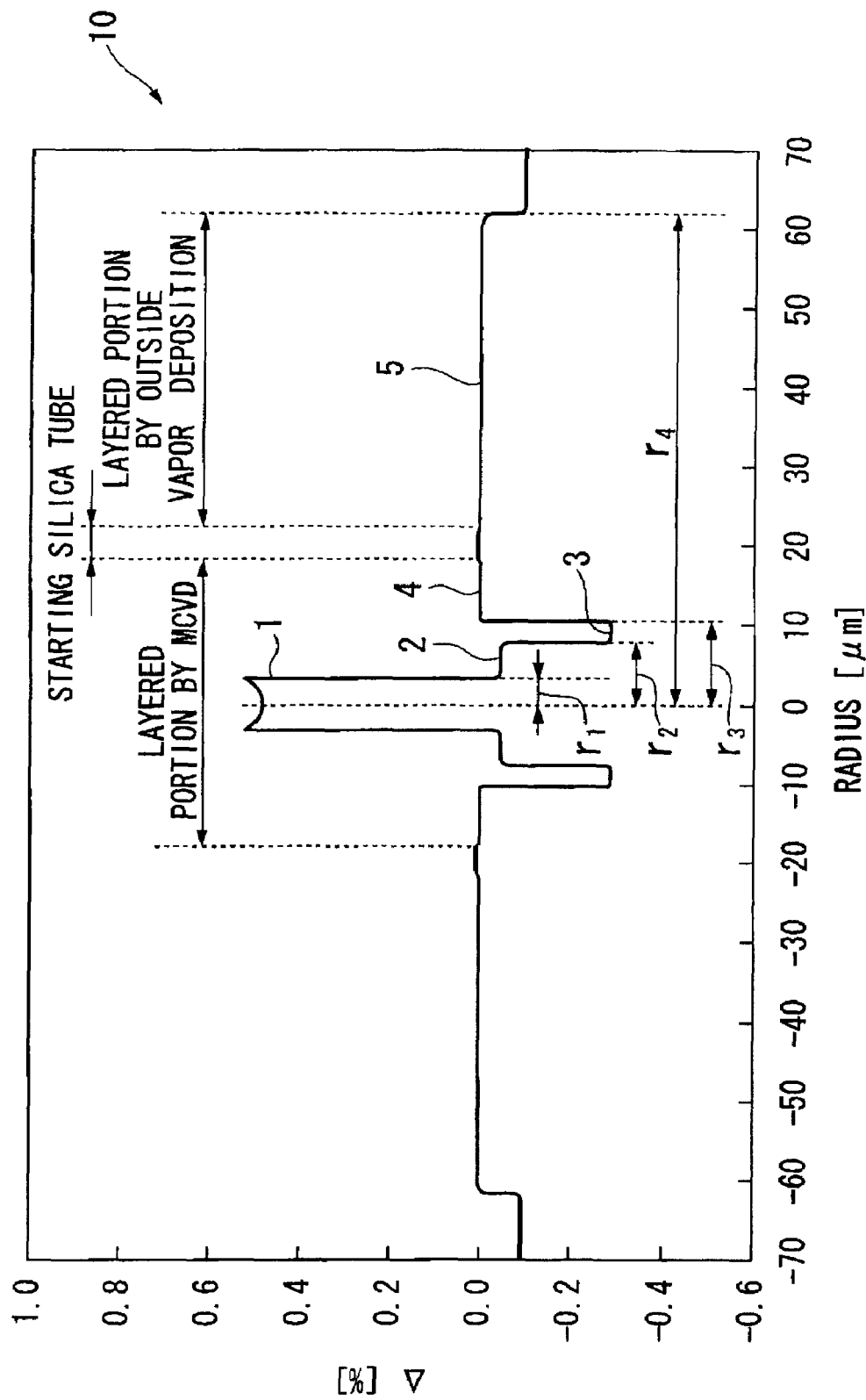
FIG. 3 is a graph showing the refractive index profile of the low bending loss SMF produced in Example 1.
Figure 4:
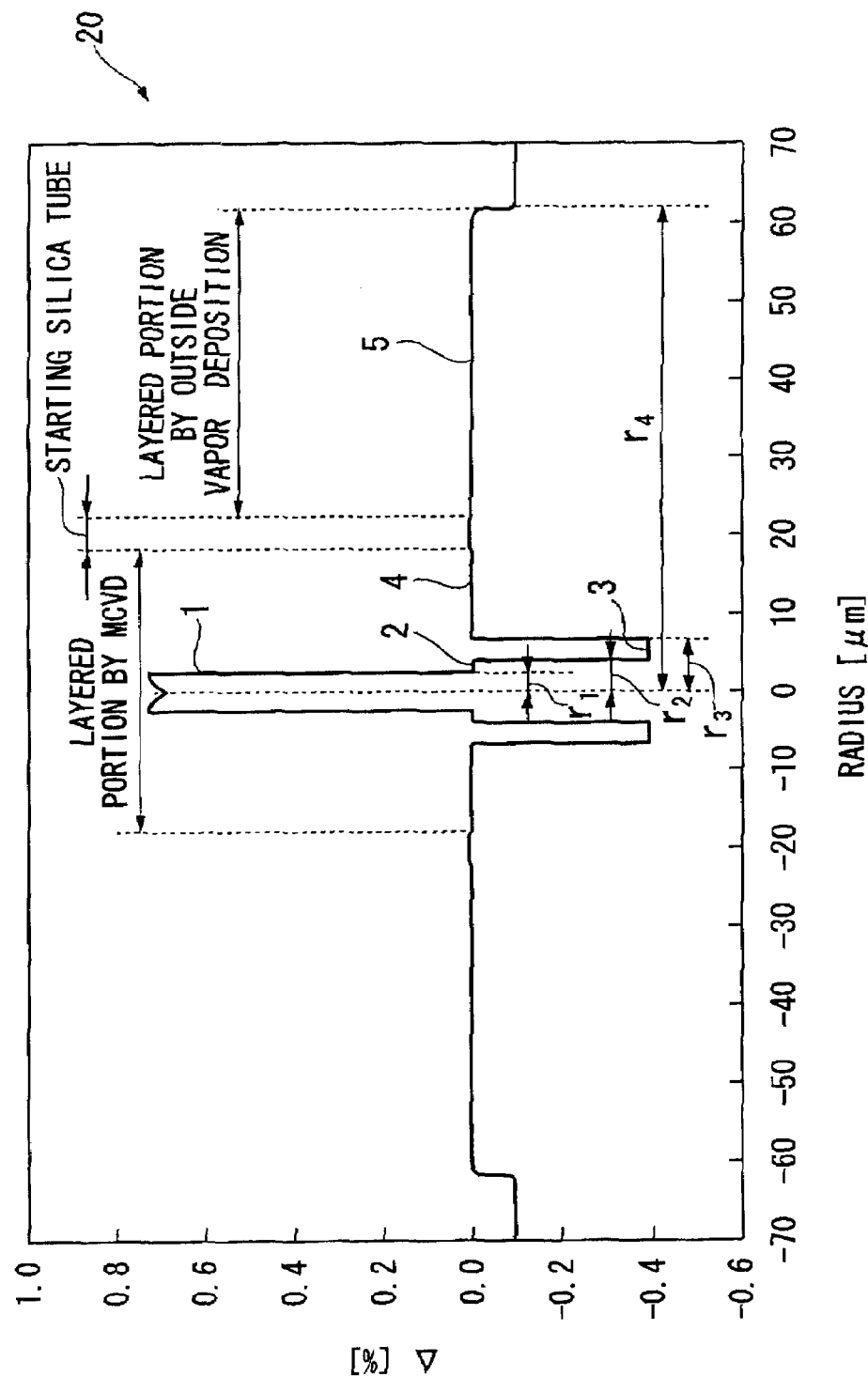
FIG. 4 is a graph showing the refractive index profile of the low bending loss SMF produced in Example 2.
Figure 5:
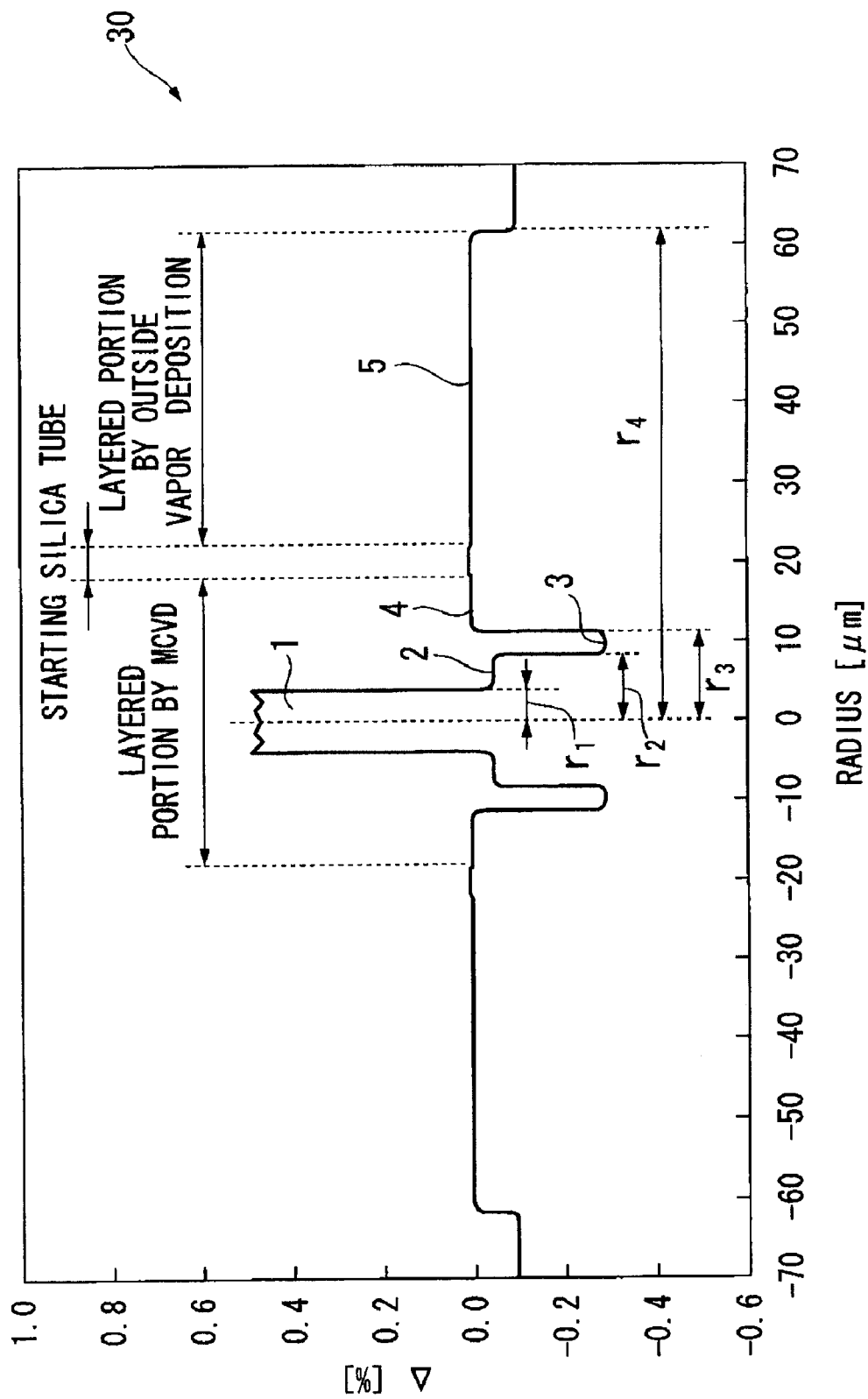
FIG. 5 is a graph showing the refractive index profile of the low bending loss SMF produced in Example 3.

In an exemplary embodiment of the present invention, it is preferable that the low bending loss SMF include a central core that has a radius $r_1$ and a refractive index $n_1$; an inner cladding that is provided around the outer circumference of the central core and has a radius $r_2$ and a refractive index $n_2$; a trench portion that is provided around the outer circumference of the inner cladding and has a radius $r_3$ and a refractive index $n_3$; and an outer cladding that is provided around the outer circumference of the trench portion and has a radius $r_4$ and a refractive index $n_4$, with a refractive index profile in which the refractive indices of the individual portions satisfy $n_1 > n_4 \geq n_2 > n_3$. Note that the respective radii $r_2$, $r_3$, and $r_4$ of the inner cladding, the trench portion, and the outer cladding are distances from the center of the central core to the outer periphery edge of the relevant portions. FIG. 3 to FIG. 5 exemplify a refractive index profile of respective low bending loss SMFs 10, 20, and 30 with a trench portion. In the figures, reference numeral 1 denotes a central core, reference numeral 2 an inner cladding, reference numeral 3 a trench portion, and reference numerals 4 and 5 outer claddings.

Such refractive index profiles are disclosed in Patent Document 4. The invention described in Patent Document 4 discloses the effect of this refractive index profile in the design of a so-called dispersion-shifted optical fiber that has a zero-dispersion wavelength near 1550 nm. However, it does not disclose the main object of the present invention, that is, the effect of this refractive index profile with the zero-dispersion wavelength near 1300 nm.

In the low bending loss SMF 10, 20, and 30 with the trench portion, it is preferable that with reference to the refractive index $n_4$, a relative refractive index difference $\Delta_1$ of the central core, a relative refractive index difference $\Delta_2$ of the inner cladding, and a relative refractive index difference $\Delta_3$ of the trench portion satisfy the following conditions:

$0.40\% \leq \Delta_1 \leq 0.85\%$ $-0.20\% \leq \Delta_2 \leq 0.00\%$ $-1.0\% < \Delta_3 < \Delta_2$.

Furthermore, it is preferable that a radius $r_1$ of the central core, a radius $r_2$ of the inner cladding, and a radius $r_3$ of the trench portion satisfy the following conditions:

$1.5 < r_2/r_1 < 3.0$ $0.5 < (r_3 - r_2)/r_1 < 3.0$.

When the relative refractive index difference $\Delta_1$ of the central core falls below 0.40%, the MFD at a wavelength of 1310 nm exceeds 7.9 μm. In association with this, the bending loss produced when the fiber is wound around a 10-mm radius for 10 turns exceeds 0.1 dB at a wavelength of 1550 nm. Therefore, the characteristic of low bending loss, which is an object of the present invention, cannot be satisfied. Furthermore, when the relative refractive index difference $\Delta_1$ of the central core is more than 0.85%, it becomes impossible to retain the zero-dispersion wavelength in the range of 1300 nm to 1324 nm.

The relative refractive index difference $\Delta_2$ of the inner cladding needs to be in the range of −0.20% to 0.00% from the viewpoint of the zero-dispersion wavelength and the chromatic dispersion value at 1550 nm. When $\Delta_2$ is less than −0.20%, $r_2/r_1$ needs to be 3.0 or more to satisfy the desired zero-dispersion wavelength and 1550-nm chromatic dispersion. This is not desirable from the viewpoint of fiber manufacturing. Furthermore, when $\Delta_2$ is more than 0.00%, the conditions of the zero-dispersion wavelength of 1300 nm to 1324 nm and the chromatic dispersion value of typical 17 ps/nm/km at a wavelength of 1550 nm cannot be satisfied.

The relative refractive index difference $\Delta_3$ of the trench portion needs to be −1.0% or more, and less than $\Delta_3$ from the viewpoint of reduction in bending loss.

Figure 1:
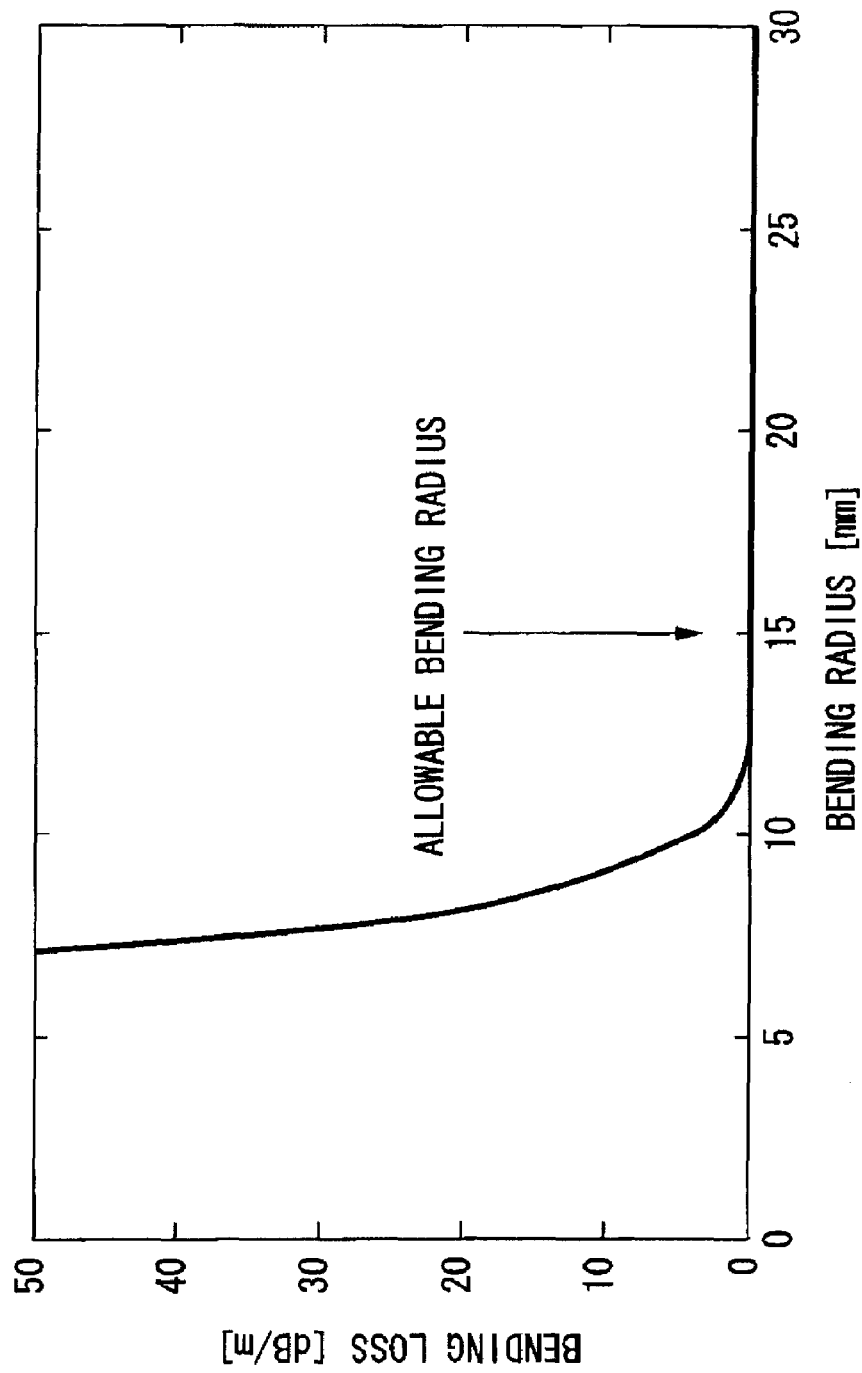
FIG. 1 is a graph exemplifying a bending radius dependence of a bending loss in the related art SMF.
Figure 2:
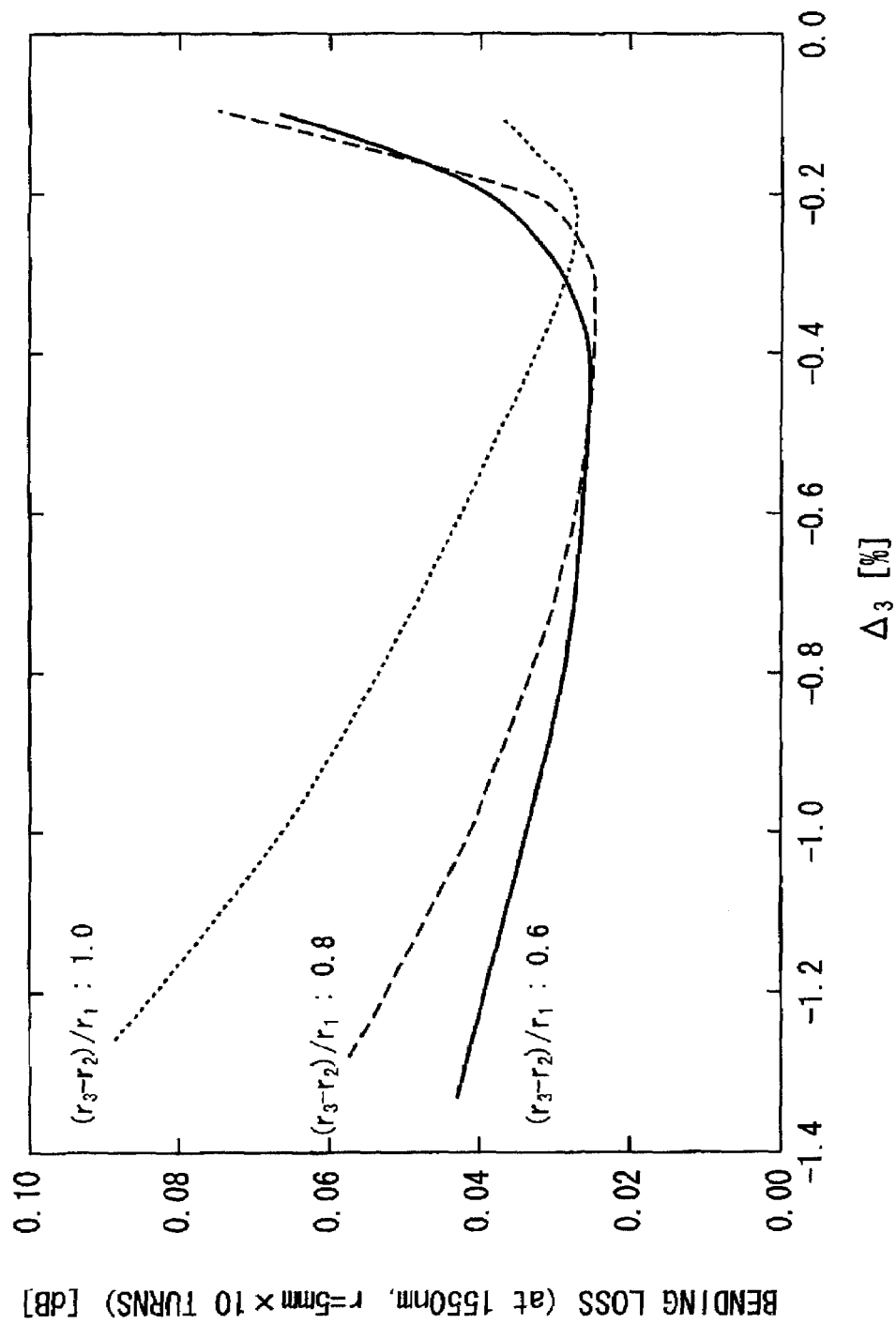
FIG. 2 is a graph exemplifying a $\Delta_3$ dependence of the bending loss.

FIG. 2 is a graph showing the simulation results of $\Delta_3$ dependence of a bending loss in an SMF that has a refractive index profile of $r_2/r_1=2.2$, $\Delta_1=0.50\%$, $\Delta_2=0.0\%$, and $\Delta_3=-0.1$ to −1.3%, with $(r_3-r_2)/r_1$ being changed to 0.6, 0.8, and 1.5. Note that in the simulation, a cable cut-off wavelength is assumed as the cut-off wavelength, and the cable cut-off wavelength is 1220 nm in all the cases. As is seen from FIG. 2, the bending loss changes so as to take a local minimal value with respect to $\Delta_3$, although the tendency varies according to the difference in $(r_3-r_2)/r_1$. Therefore, unless $\Delta_3$ has a relative refractive index smaller than $\Delta_2$, a sufficient effect of bending loss reduction cannot be obtained. Furthermore, when $\Delta_3$ is less than −0.1%, the effect is lost from the viewpoint of reduction in bending loss. It is desirable that $\Delta_3$ be in the range of −0.2% to −0.6%.

The ratio of $r_2/r_1$ is selected from the range of 1.5 to 3.0 according to $\Delta_1$ and the like. When $\Delta_1$ is small, a large $r_2/r_1$ is selected from the range; when $\Delta_1$ is large, a small $r_2/r_1$ is selected from the range.

The ratio of $(r_3-r_2)/r_1$ can be flexibly set in combination with $\Delta_3$. However, when $(r_3-r_2)/r_1$ falls below 0.5, a sufficient effect cannot be obtained from the viewpoint of control over chromatic dispersion and reduction in bending loss. Furthermore, when $(r_3-r_2)/r_1$ exceeds 3.0, it may be difficult to make the single-mode transmission available.

The radius $r_3$ of the trench portion is selected from the range of 5.0 μm to 20 μm according to a combination of the above-described parameters.

The radius $r_4$ of the outer cladding can be set irrespective of the above-described parameters. In many cases, the radius $r_4$ of the outer cladding of a general optical fiber has 62.5 μm (diameter of 125 μm) as its center value. However, the center value for the radius is appropriately set in the range of 30 μm to 62.5 μm according to the purpose of use. For example, in an optical fiber for component use that is assumed to be stored by being wound around a small bending radius, the radius is often set to 40 μm. Therefore, it is desirable that $r_4$ be in the range of 28 μm to 64 μm, with the manufacturing margin taken into consideration.

Tables 1 to 3 show design examples, in various conditions, of the low bending loss SMF with a trench according to exemplary embodiments of the present invention (refer to Example 1 to Example 22). In Example 1 to Example 22, the cable cut-off wavelength is 1220 nm.

TABLE 1

| | | Example | | | | | | | | |
|---|---|---|---|---|---|---|---|---|---|---|
| | | 1 | 2 | 3 | 4 | 5 | 6 | 7 | 8 | 9 |
| $r_2/r_1$ | — | 1.5 | 1.5 | 1.5 | 1.5 | 1.5 | 1.5 | 1.5 | 1.5 | 1.8 |
| $r_3/r_1$ | — | 2.5 | 2.5 | 2.5 | 2.5 | 3.0 | 2.2 | 2.0 | 2.5 | 2.8 |
| $(r_3-r_2)/r_1$ | — | 1.0 | 1.0 | 1.0 | 1.0 | 1.5 | 0.7 | 0.5 | 1.0 | 1.0 |
| $r_3$ | [μm] | 6.93 | 7.10 | 7.26 | 7.63 | 8.88 | 6.79 | 6.13 | 8.14 | 8.88 |
| $\Delta_1$ | [%] | 0.85 | 0.85 | 0.85 | 0.70 | 0.70 | 0.70 | 0.70 | 0.60 | 0.60 |
| $\Delta_2$ | [%] | 0.00 | −0.10 | −0.20 | 0.00 | 0.00 | 0.00 | 0.00 | 0.00 | 0.00 |
| $\Delta_3$ | [%] | −0.40 | −0.40 | −0.40 | −0.40 | −0.40 | −0.40 | −0.40 | −0.30 | −0.30 |
| Cable Cut-off Wavelength | [μm] | 1.22 | 1.22 | 1.22 | 1.22 | 1.22 | 1.22 | 1.22 | 1.22 | 1.22 |
| MFD (at 1310 nm) | [μm] | 5.63 | 5.59 | 5.55 | 6.17 | 6.08 | 6.22 | 6.21 | 6.66 | 6.72 |
| MFD (at 1550 nm) | [μm] | 6.17 | 6.12 | 6.07 | 6.75 | 6.65 | 6.81 | 6.84 | 7.30 | 7.44 |
| Zero-Dispersion Wavelength | [nm] | 1318.5 | 1315.9 | 1311.4 | 1304.7 | 1307.1 | 1306.7 | 1314.1 | 1305.4 | 1321.1 |
| Zero-Dispersion Slope | [ps/nm$^2$/km] | 0.085 | 0.084 | 0.084 | 0.089 | 0.089 | 0.088 | 0.084 | 0.089 | 0.087 |
| Chromatic dispersion Value (at 1310 nm) | [ps/nm/km] | −0.7 | −0.5 | −0.1 | 0.5 | 0.3 | 0.3 | −0.3 | 0.4 | −1.0 |
| Dispersion Slope (at 1310 nm) | [ps/nm$^2$/km] | 0.086 | 0.086 | 0.085 | 0.088 | 0.088 | 0.087 | 0.085 | 0.088 | 0.089 |
| Chromatic dispersion Value (at 1550 nm) | [ps/nm/km] | 15.3 | 15.3 | 15.5 | 17.1 | 17.0 | 16.5 | 15.3 | 17.0 | 16.1 |
| Dispersion Slope (at 1550 nm) | [ps/nm$^2$/km] | 0.052 | 0.052 | 0.051 | 0.055 | 0.056 | 0.053 | 0.051 | 0.055 | 0.058 |
| RDS (at 1550 nm) | [nm$^{-1}$] | 0.0034 | 0.0034 | 0.0033 | 0.0032 | 0.0033 | 0.0032 | 0.0033 | 0.0032 | 0.0036 |
| Bending Loss (at 1550 nm) [dB] | r = 5 mm × 10 turns | 0.00 | 0.00 | 0.00 | 0.04 | 0.04 | 0.05 | 0.07 | 0.34 | 0.42 |
| | r = 7.5 mm × 10 turns | 0.00 | 0.00 | 0.00 | 0.00 | 0.00 | 0.00 | 0.00 | 0.01 | 0.02 |
| | r = 10 mm × 10 turns | 0.00 | 0.00 | 0.00 | 0.00 | 0.00 | 0.00 | 0.00 | 0.00 | 0.00 |

TABLE 1-continued

|  |  | Example | | | | | | | | |
|---|---|---|---|---|---|---|---|---|---|---|
|  |  | 1 | 2 | 3 | 4 | 5 | 6 | 7 | 8 | 9 |
| Bending Loss (at 1650 nm)[dB] | r = 5 mm × 10 turns | 0.02 | 0.02 | 0.02 | 0.22 | 0.21 | 0.25 | 0.35 | 1.17 | 1.35 |
|  | r = 7.5 mm × 10 turns | 0.00 | 0.00 | 0.00 | 0.01 | 0.01 | 0.01 | 0.01 | 0.09 | 0.11 |
|  | r = 10 mm × 10 turns | 0.00 | 0.00 | 0.00 | 0.00 | 0.00 | 0.00 | 0.00 | 0.01 | 0.02 |

TABLE 2

|  |  | Example | | | | | | | | |
|---|---|---|---|---|---|---|---|---|---|---|
|  |  | 10 | 11 | 12 | 13 | 14 | 15 | 16 | 17 | 18 |
| $r_2/r_1$ | — | 1.8 | 1.8 | 2.0 | 2.0 | 2.2 | 2.2 | 2.4 | 2.4 | 2.2 |
| $r_3/r_1$ | — | 2.8 | 2.8 | 3.0 | 3.0 | 3.0 | 3.0 | 3.2 | 3.9 | 3.7 |
| $(r_3 - r_2)/r_1$ | — | 1.0 | 1.0 | 1.0 | 1.0 | 0.8 | 0.8 | 0.8 | 1.5 | 1.5 |
| $r_3$ | [μm] | 9.09 | 9.83 | 10.38 | 10.70 | 10.77 | 11.33 | 12.00 | 14.02 | 13.40 |
| $\Delta_1$ | [%] | 0.60 | 0.50 | 0.50 | 0.50 | 0.50 | 0.45 | 0.45 | 0.45 | 0.45 |
| $\Delta_2$ | [%] | −0.05 | 0.00 | 0.00 | −0.05 | −0.05 | −0.05 | −0.05 | −0.05 | −0.05 |
| $\Delta_3$ | [%] | −0.30 | −0.30 | −0.30 | −0.30 | −0.30 | −0.30 | −0.30 | −0.25 | −0.25 |
| Cable Cut-off Wavelength | [μm] | 1.22 | 1.22 | 1.22 | 1.22 | 1.22 | 1.22 | 1.22 | 1.22 | 1.22 |
| MFD (at 1310 nm) | [μm] | 6.66 | 7.38 | 7.40 | 7.32 | 7.36 | 7.73 | 7.72 | 7.59 | 7.60 |
| MFD (at 1550 nm) | [μm] | 7.36 | 8.14 | 8.22 | 8.09 | 8.16 | 8.57 | 8.58 | 8.49 | 8.47 |
| Zero-Dispersion Wavelength | [nm] | 1317.9 | 1309.0 | 1317.7 | 1312.7 | 1316.0 | 1311.1 | 1314.6 | 1321.9 | 1317.8 |
| Zero-Dispersion Slope | [ps/nm²/km] | 0.087 | 0.090 | 0.088 | 0.088 | 0.087 | 0.088 | 0.087 | 0.085 | 0.086 |
| Chromatic dispersion Value (at 1310 nm) | [ps/nm/km] | −0.7 | 0.1 | −0.7 | −0.2 | −0.5 | −0.1 | −0.4 | −1.0 | −0.7 |
| Dispersion Slope (at 1310 nm) | [ps/nm²/km] | 0.088 | 0.090 | 0.090 | 0.089 | 0.088 | 0.088 | 0.088 | 0.087 | 0.088 |
| Chromatic dispersion Value (at 1550 nm) | [ps/nm/km] | 16.2 | 17.6 | 16.8 | 17.0 | 16.5 | 17.1 | 16.7 | 16.0 | 16.5 |
| Dispersion Slope (at 1550 nm) | [ps/nm²/km] | 0.057 | 0.060 | 0.061 | 0.060 | 0.059 | 0.060 | 0.060 | 0.060 | 0.060 |
| RDS (at 1550 nm) | [nm⁻¹] | 0.0035 | 0.0034 | 0.0036 | 0.0035 | 0.0036 | 0.0035 | 0.0036 | 0.0037 | 0.0036 |
| Bending Loss (at 1550 nm)[dB] | r = 5 mm × 10 turns | 0.36 | 1.40 | 1.43 | 1.22 | 1.27 | 2.31 | 2.36 | 1.57 | 1.59 |
|  | r = 7.5 mm × 10 turns | 0.01 | 0.13 | 0.14 | 0.12 | 0.11 | 0.32 | 0.34 | 0.29 | 0.28 |
|  | r = 10 mm × 10 turns | 0.00 | 0.02 | 0.02 | 0.02 | 0.02 | 0.08 | 0.09 | 0.09 | 0.09 |
| Bending Loss (at 1650 nm)[dB] | r = 5 mm × 10 turns | 1.19 | 3.35 | 3.33 | 2.91 | 3.02 | 4.77 | 4.80 | 3.12 | 3.20 |
|  | r = 7.5 mm × 10 turns | 0.10 | 0.51 | 0.53 | 0.46 | 0.45 | 1.02 | 1.06 | 0.86 | 0.86 |
|  | r = 10 mm × 10 turns | 0.01 | 0.14 | 0.15 | 0.13 | 0.12 | 0.40 | 0.43 | 0.43 | 0.42 |

TABLE 3

|  |  | Example | | | |
|---|---|---|---|---|---|
|  |  | 19 | 20 | 21 | 22 |
| $r_2/r_1$ | — | 2.3 | 2.3 | 3.0 | 1.5 |
| $r_3/r_1$ | — | 3.0 | 2.8 | 3.5 | 4.5 |
| $(r_3 - r_2)/r_1$ | — | 0.8 | 0.5 | 0.5 | 3.0 |
| $r_3$ | [μm] | 11.75 | 10.53 | 12.37 | 16.35 |
| $\Delta_1$ | [%] | 0.40 | 0.40 | 0.50 | 0.45 |
| $\Delta_2$ | [%] | −0.12 | −0.12 | −0.05 | 0.00 |
| $\Delta_3$ | [%] | −0.300 | −1.000 | −0.250 | −0.050 |
| Cable Cut-off Wavelength | [μm] | 1.15 | 1.10 | 1.20 | 1.22 |
| MFD (at 1310 nm) | [μm] | 7.78 | 7.68 | 7.34 | 7.80 |
| MFD (at 1550 nm) | [μm] | 8.60 | 8.45 | 8.21 | 8.74 |
| Zero-Dispersion Wavelength | [nm] | 1304.1 | 1301.9 | 1324.0 | 1321.3 |
| Zero-Dispersion Slope | [ps/nm²/km] | 0.088 | 0.088 | 0.083 | 0.085 |
| Chromatic dispersion Value (at 1310 nm) | [ps/nm/km] | 0.5 | 0.7 | −1.2 | −1.0 |

TABLE 3-continued

|  |  | Example | | | |
|---|---|---|---|---|---|
|  |  | 19 | 20 | 21 | 22 |
| Dispersion Slope (at 1310 nm) | [ps/nm²/km] | 0.087 | 0.089 | 0.085 | 0.087 |
| Chromatic dispersion Value (at 1550 nm) | [ps/nm/km] | 17.4 | 18.2 | 15.2 | 15.8 |
| Dispersion Slope (at 1550 nm) | [ps/nm²/km] | 0.058 | 0.061 | 0.057 | 0.058 |
| RDS (at 1550 nm) | [nm⁻¹] | 0.0034 | 0.0034 | 0.0038 | 0.0037 |
| Bending Loss (at 1550 nm)[dB] | r = 5 mm × 10 turns | 6.96 | 2.93 | 3.28 | 7.9 |
|  | r = 7.5 mm × 10 turns | 1.96 | 0.93 | 0.32 | 1.16 |
|  | r = 10 mm × 10 turns | 0.50 | 0.27 | 0.03 | 0.15 |
| Bending Loss (at 1650 nm)[dB] | r = 5 mm × 10 turns | 12.34 | 5.29 | 7.51 | 15.3 |
|  | r = 7.5 mm × 10 turns | 4.99 | 2.42 | 3.33 | 3.4 |
|  | r = 10 mm × 10 turns | 0.92 | 0.50 | 0.49 | 0.70 |

As shown in Tables 1 and 2, in the low bending loss SMFs in Example 1 to Example 18 according to exemplary embodiments of the present invention, the chromatic dispersion value at a wavelength of 1550 nm is +18 ps/nm/km or less, and the bending loss produced when the fiber is wound around a 10-mm radius for 10 turns is 0.1 dB or less at a wavelength of 1550 nm. Therefore, an SMF with very low bending loss can be actualized while conforming to the chromatic dispersion characteristics defined under G.652.

The low bending loss SMF of exemplary embodiments of the present invention can be manufactured with the same material (for example, silica-based glass) as that for the related art known SMF and by a similar manufacturing method to that for the related art known SMF, with the exception being that the refractive index profile and radius of each layer are appropriately set so as to satisfy the individual parameters described above.

The low bending loss SMF of exemplary embodiments of the present invention has a very low bending loss while conforming to the chromatic dispersion characteristics defined under G.652. Therefore, it can be preferably utilized as an SMF for indoor wiring in an FTTH system and the like.

Figure 6:
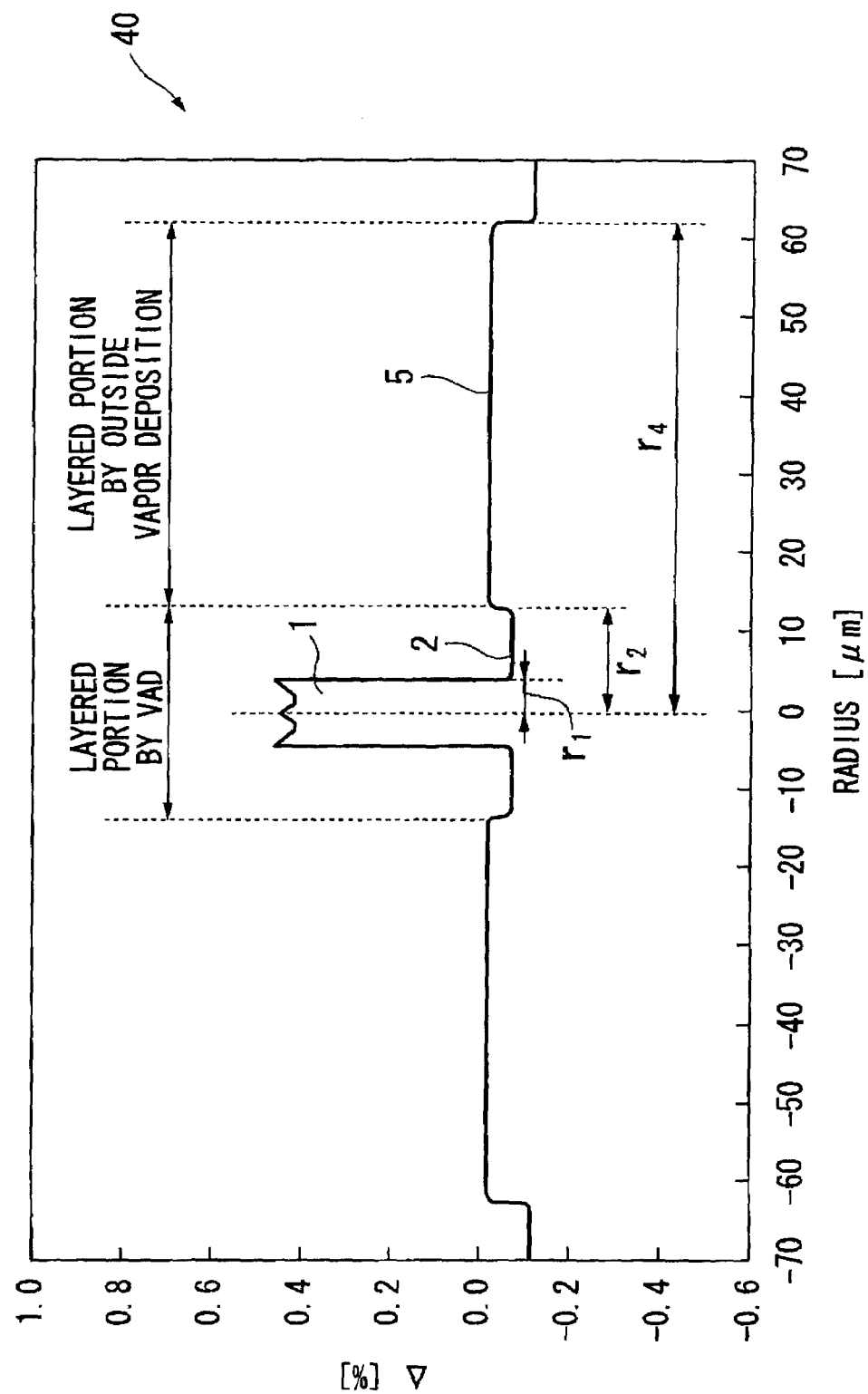
FIG. 6 is a graph showing the refractive index profile of the low bending loss SMF produced in Example 4.
Figure 7:
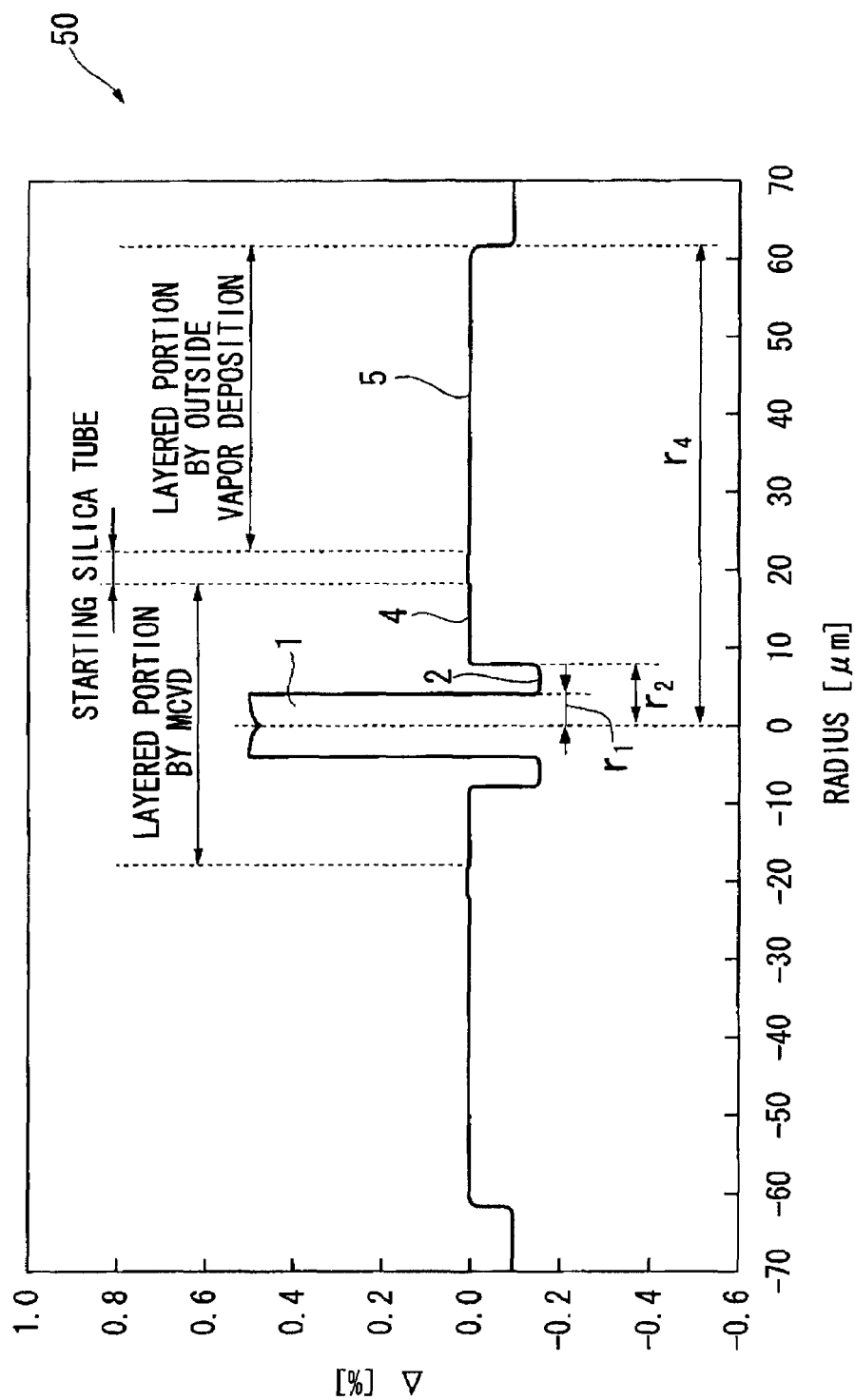
FIG. 7 is a graph showing the refractive index profile of the low bending loss SMF produced in Example 5.
Figure 8:
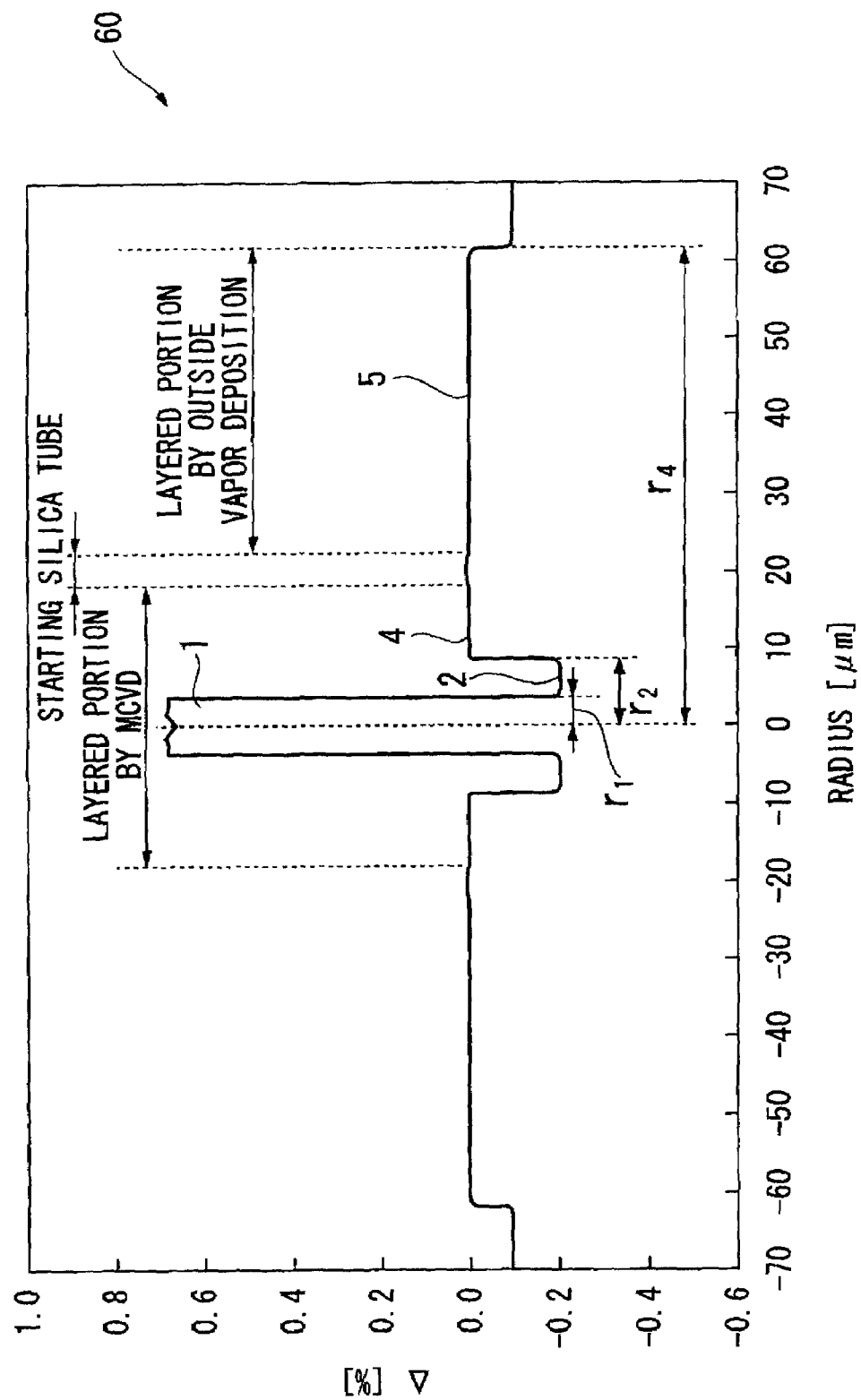
FIG. 8 is a graph showing the refractive index profile of the low bending loss SMF produced in Example 6.

In another exemplary embodiment of the present invention, a low bending loss SMF includes a central core that has a radius $r_1$ and a refractive index $n_1$; an inner cladding that is provided around the outer circumference of the central core and has a radius $r_2$ and a refractive index $n_2$; and an outer cladding that is provided around the outer circumference of the inner cladding and has a radius $r_4$ and a refractive index $n_4$, the SMF having a W-shaped refractive index profile in which the refractive indices of the individual portions satisfy $n_1 > n_4 > n_2$. Note that the respective radii $r_2$ and $r_4$ of the inner cladding and the outer cladding are distances from the center of the central core to the outer periphery edge of the relevant portions. FIG. 6 to FIG. 8 exemplify refractive index profiles of the low bending loss SMFs 40, 50, and 60 with the W-shaped refractive index profile of the present invention. In the figures, reference numeral 1 denotes a central core, reference numeral 2 an inner cladding, and reference numerals 4 and 5 outer claddings.

In the low bending loss SMFs 40, 50, and 60 with the W-shaped refractive index profile, if a relative refractive index difference of the central core is $\Delta_1$ and a relative refractive index difference of the inner cladding is $\Delta_2$ with reference to the outer cladding, it is preferable that the following conditions be satisfied:

$$0.42\% \leq \Delta_1 \leq 0.85\%$$

$$1.5 \leq r_2/r_1 \leq 5.0$$

$$-1.0\% \leq \Delta_2 \leq -0.05\%.$$

Furthermore, if $y=(r_2/r_1)\cdot|\Delta_2|$, it is preferable that the following relations be satisfied:

$$1.4\cdot\Delta_1 - 0.8 \leq y \leq 1.4\cdot\Delta_1 - 0.05$$

$$y \geq 0.075\%.$$

When the relative refractive index difference $\Delta_1$ of the central core falls below 0.42%, the MFD at a wavelength of 1310 nm exceeds 7.9 μm. In association with this, the bending loss produced when the fiber is wound around a 10-mm radius for 10 turns exceeds 0.5 dB at a wavelength of 1550 nm. Therefore, the actualization of the characteristic of low bending loss, which is an object of the present invention, cannot be achieved. On the other hand, when the relative refractive index difference $\Delta_1$ exceeds 0.85%, the MFD at a wavelength of 1310 falls below 5.5 μm. This may lead to deteriorated connectivity, and thus is not preferable. As for $r_2/r_1$ and $\Delta_2$ that define the inner cladding, it is preferable that $r_2/r_1$ be in the range of 1.5 to 5.0, and $\Delta_2$ be in the range of −1.0% to −0.05%. For these parameters, appropriate values are selected according to the manufacturing methods.

Furthermore, as for $r_2/r_1$, $\Delta_1$, and $\Delta_2$, it is preferable that y, defined by $y=(r_2/r_1)\cdot|\Delta_2|$, be set so as to be in the range of $(1.4\cdot\Delta_1-0.8)$ to $(1.4\cdot\Delta_1-0.05)$. Setting y in the above-mentioned range with respect to $\Delta_1$ enables the restriction of the zero-dispersion wavelength in the range of 1300 nm to 1324 nm. Note that the above-mentioned two conditions cannot be satisfied when y is less than 0.075%.

In the low bending loss SMFs 40, 50, and 60 with the W-shaped refractive index profile, it is preferable that the radius $r_2$ of the inner cladding be in the range of 4.5 μm to 16 μm.

The radius $r_4$ of the outer cladding can be set irrespective of the above-described parameters. In many cases, the radius $r_4$ of the outer cladding of a general optical fiber has 62.5 μm (diameter of 125 μm) as its center value. However, the center value for the radius is appropriately set in the range of 30 μm to 62.5 μm according to the purpose of use. For example, in an optical fiber for component use that is assumed to be stored by being wound around a small bending radius, the radius is often set to 40 μm. Therefore, it is desirable that r4 be in the range of 28 μm to 64 μm, with the manufacturing margin taken into consideration.

Tables 4 to 6 show design examples, in various conditions, of the low bending loss SMF according to exemplary embodiments of the present invention with a W-shaped refractive index profile (refer to Example 23 to Example 44). In Example 23 to Example 44, the cable cut-off wavelength is 1220 nm.

TABLE 4

| | | Example | | | | | | | | |
|---|---|---|---|---|---|---|---|---|---|---|
| | | 23 | 24 | 25 | 26 | 27 | 28 | 29 | 30 | 31 |
| $r_2/r_1$ | — | 1.5 | 3.5 | 3.5 | 3.0 | 2.0 | 2.0 | 1.5 | 3.5 | 2.5 |
| $r_2$ | [μm] | 6.35 | 13.60 | 12.95 | 11.54 | 7.42 | 7.66 | 5.71 | 12.88 | 8.88 |
| $\Delta_1$ | [%] | 0.42 | 0.44 | 0.48 | 0.48 | 0.50 | 0.50 | 0.52 | 0.52 | 0.54 |
| $\Delta_2$ | [%] | −0.20 | −0.05 | −0.05 | −0.10 | −0.10 | −0.15 | −0.25 | −0.10 | −0.05 |
| $(r_2/r_1) \cdot |\Delta_2|$ | [%] | 0.300 | 0.175 | 0.175 | 0.300 | 0.200 | 0.300 | 0.375 | 0.350 | 0.125 |
| Cable Cut-off Wavelength | [μm] | 1.22 | 1.22 | 1.22 | 1.22 | 1.22 | 1.22 | 1.22 | 1.22 | 1.22 |
| MFD (at 1310 nm) | [μm] | 7.89 | 7.90 | 7.56 | 7.50 | 7.33 | 7.29 | 7.08 | 7.22 | 7.20 |
| MFD (at 1550 nm) | [μm] | 8.75 | 8.79 | 8.43 | 8.28 | 8.14 | 8.03 | 7.85 | 7.97 | 8.02 |
| Zero-Dispersion Wavelength | [nm] | 1304.4 | 1313.1 | 1318.3 | 1306.0 | 1314.9 | 1304.0 | 1312.2 | 1310.3 | 1322.0 |
| Zero-Dispersion Slope | [ps/nm$^2$/km] | 0.085 | 0.086 | 0.084 | 0.087 | 0.083 | 0.086 | 0.081 | 0.086 | 0.083 |
| Chromatic dispersion Value (at 1310 nm) | [ps/nm/km] | 0.5 | −0.3 | −0.7 | 0.3 | −0.4 | 0.5 | −0.2 | 0.0 | −1.0 |
| Dispersion Slope (at 1310 nm) | [ps/nm$^2$/km] | 0.084 | 0.087 | 0.086 | 0.087 | 0.084 | 0.085 | 0.082 | 0.086 | 0.085 |
| Chromatic dispersion Value (at 1550 nm) | [ps/nm/km] | 16.2 | 16.4 | 15.8 | 16.9 | 15.5 | 16.5 | 14.9 | 16.4 | 15.2 |
| Dispersion Slope (at 1550 nm) | [ps/nm$^2$/km] | 0.053 | 0.057 | 0.056 | 0.056 | 0.053 | 0.053 | 0.050 | 0.056 | 0.055 |
| RDS (at 1550 nm) | [nm$^{-1}$] | 0.0033 | 0.0035 | 0.0036 | 0.0033 | 0.0034 | 0.0032 | 0.0033 | 0.0034 | 0.0036 |
| Bending Loss (at 1550 nm)[dB] | r = 5 mm × 10 turns | 11.04 | 5.30 | 3.08 | 1.94 | 3.39 | 2.51 | 2.33 | 0.91 | 1.53 |
| | r = 7.5 mm × 10 turns | 1.68 | 0.71 | 0.30 | 0.18 | 0.28 | 0.19 | 0.16 | 0.06 | 0.08 |
| | r = 10 mm × 10 turns | 0.24 | 0.09 | 0.03 | 0.01 | 0.02 | 0.01 | 0.01 | 0.00 | 0.00 |
| Bending Loss (at 1650 nm) [dB] | r = 5 mm × 10 turns | 20.79 | 10.24 | 6.70 | 4.45 | 7.94 | 6.12 | 6.02 | 2.35 | 4.00 |
| | r = 7.5 mm × 10 turns | 4.80 | 2.11 | 1.07 | 0.67 | 1.09 | 0.80 | 0.72 | 0.27 | 0.36 |
| | r = 10 mm × 10 turns | 1.02 | 0.40 | 0.16 | 0.09 | 0.14 | 0.10 | 0.08 | 0.03 | 0.03 |

TABLE 5

| | | Example | | | | | | | | |
|---|---|---|---|---|---|---|---|---|---|---|
| | | 32 | 33 | 34 | 35 | 36 | 37 | 38 | 39 | 40 |
| $r_2/r_1$ | — | 3.0 | 1.5 | 2.0 | 2.5 | 2.0 | 3.0 | 2.0 | 2.5 | 1.5 |
| $r_2$ | [μm] | 10.58 | 5.44 | 6.92 | 8.24 | 6.55 | 9.40 | 6.44 | 7.98 | 4.87 |
| $\Delta_1$ | [%] | 0.56 | 0.58 | 0.64 | 0.68 | 0.72 | 0.74 | 0.74 | 0.76 | 0.76 |
| $\Delta_2$ | [%] | −0.10 | −0.30 | −0.25 | −0.20 | −0.30 | −0.20 | −0.30 | −0.30 | −0.50 |
| $(r_2/r_1) \cdot |\Delta_2|$ | [%] | 0.300 | 0.450 | 0.500 | 0.500 | 0.600 | 0.600 | 0.600 | 0.750 | 0.750 |
| Cable Cut-off Wavelength | [μm] | 1.22 | 1.22 | 1.22 | 1.22 | 1.22 | 1.22 | 1.22 | 1.22 | 1.22 |
| MFD (at 1310 nm) | [μm] | 6.96 | 6.69 | 6.40 | 6.25 | 6.02 | 6.00 | 5.94 | 5.87 | 5.80 |
| MFD (at 1550 nm) | [μm] | 7.70 | 7.41 | 7.01 | 6.86 | 6.59 | 6.59 | 6.50 | 6.40 | 6.38 |
| Zero-Dispersion Wavelength | [nm] | 1315.4 | 1314.1 | 1302.4 | 1310.0 | 1303.2 | 1315.5 | 1305.6 | 1301.7 | 1312.8 |
| Zero-Dispersion Slope | [ps/nm$^2$/km] | 0.084 | 0.080 | 0.085 | 0.084 | 0.084 | 0.083 | 0.084 | 0.086 | 0.076 |
| Chromatic dispersion Value (at 1310 nm) | [ps/nm/km] | −0.5 | −0.3 | 0.6 | 0.0 | 0.6 | −0.5 | 0.4 | 0.7 | −0.2 |
| Dispersion Slope (at 1310 nm) | [ps/nm$^2$/km] | 0.085 | 0.080 | 0.083 | 0.084 | 0.083 | 0.084 | 0.082 | 0.084 | 0.077 |
| Chromatic dispersion Value (at 1550 nm) | [ps/nm/km] | 15.7 | 14.4 | 16.0 | 15.7 | 15.6 | 15.2 | 15.3 | 16.3 | 13.3 |
| Dispersion Slope (at 1550 nm) | [ps/nm$^2$/km] | 0.055 | 0.048 | 0.050 | 0.052 | 0.048 | 0.052 | 0.047 | 0.051 | 0.041 |
| RDS (at 1550 nm) | [nm$^{-1}$] | 0.0035 | 0.0033 | 0.0031 | 0.0033 | 0.0031 | 0.0034 | 0.0031 | 0.0031 | 0.0031 |
| Bending Loss (at 1550 nm)[dB] | r = 5 mm × 10 turns | 0.64 | 0.89 | 0.15 | 0.06 | 0.03 | 0.01 | 0.02 | 0.01 | 0.02 |
| | r = 7.5 mm × 10 turns | 0.03 | 0.04 | 0.00 | 0.00 | 0.00 | 0.00 | 0.00 | 0.00 | 0.00 |
| | r = 10 mm × 10 turns | 0.00 | 0.00 | 0.00 | 0.00 | 0.00 | 0.00 | 0.00 | 0.00 | 0.00 |

TABLE 5-continued

|  |  | Example | | | | | | | | |
|---|---|---|---|---|---|---|---|---|---|---|
|  |  | 32 | 33 | 34 | 35 | 36 | 37 | 38 | 39 | 40 |
| Bending Loss (at 1650 nm)[dB] | r = 5 mm × 10 turns | 1.89 | 2.83 | 0.61 | 0.29 | 0.17 | 0.08 | 0.14 | 0.05 | 0.16 |
|  | r = 7.5 mm × 10 turns | 0.16 | 0.22 | 0.03 | 0.01 | 0.00 | 0.00 | 0.00 | 0.00 | 0.00 |
|  | r = 10 mm × 10 turns | 0.01 | 0.02 | 0.00 | 0.00 | 0.00 | 0.00 | 0.00 | 0.00 | 0.00 |

TABLE 6

|  |  | Example | | | |
|---|---|---|---|---|---|
|  |  | 41 | 42 | 43 | 44 |
| $r_2/r_1$ | — | 3.0 | 5.0 | 1.5 | 2.5 |
| $r_2$ | [μm] | 8.85 | 16.97 | 4.69 | 9.52 |
| $\Delta_1$ | [%] | 0.85 | 0.60 | 0.85 | 0.45 |
| $\Delta_2$ | [%] | −0.25 | −0.10 | −0.76 | −0.05 |
| $(r_2/r_1) \cdot |\Delta_2|$ | [%] | 0.750 | 0.500 | 1.140 | 0.125 |
| Cable Cut-off Wavelength | [μm] | 1.24 | 1.23 | 1.20 | 1.24 |
| MFD (at 1310 nm) | [μm] | 5.59 | 6.73 | 5.50 | 7.79 |
| MFD (at 1550 nm) | [μm] | 6.12 | 7.45 | 5.99 | 8.70 |
| Zero-Dispersion Wavelength | [nm] | 1318.5 | 1319.8 | 1300.0 | 1316.5 |
| Zero-Dispersion Slope | [ps/nm²/km] | 0.084 | 0.082 | 0.076 | 0.087 |
| Chromatic dispersion Value (at 1310 nm) | [ps/nm/km] | −0.70 | −0.83 | 0.76 | −0.56 |
| Dispersion Slope (at 1310 nm) | [ps/nm²/km] | 0.082 | 0.085 | 0.076 | 0.086 |
| Chromatic dispersion Value (at 1550 nm) | [ps/nm/km] | 14.63 | 15.31 | 13.86 | 15.84 |
| Dispersion Slope (at 1550 nm) | [ps/nm²/km] | 0.050 | 0.055 | 0.037 | 0.056 |
| RDS (at 1550 nm) | [nm$^{-1}$] | 0.0034 | 0.0036 | 0.0026 | 0.0035 |
| Bending Loss (at 1550 nm)[dB] | r = 5 mm × 10 turns | 0.01 | 0.59 | 0.02 | 34.81 |
|  | r = 7.5 mm × 10 turns | 0.00 | 0.02 | 0.00 | 4.44 |
|  | r = 10 mm × 10 turns | 0.00 | 0.00 | 0.00 | 0.50 |
| Bending Loss (at 1650 nm)[dB] | r = 5 mm × 10 turns | 0.05 | 2.00 | 0.19 | 68.80 |
|  | r = 7.5 mm × 10 turns | 0.00 | 0.13 | 0.00 | 13.59 |
|  | r = 10 mm × 10 turns | 0.00 | 0.01 | 0.00 | 2.46 |

As shown in Tables 4 to 6, in the low bending loss SMFs in Example 23 to Example 44 according to exemplary embodiments of the present invention, the chromatic dispersion value at a wavelength of 1550 nm is +18 ps/nm/km or less, and the bending loss produced when the fiber is wound around a 10-mm radius for 10 turns is 0.5 dB or less at a wavelength of 1550 nm. Therefore, an SMF with very low bending loss can be actualized while conforming to the chromatic dispersion characteristics defined under G.652.

EXAMPLES

Example 1

In this example, the low bending loss SMF according to the present invention was manufactured based on Example 14 shown in Table 2. FIG. 3 shows the refractive index profile of the low bending loss SMF 10 manufactured in this example. This low bending loss SMF 10 was manufactured by first layering the central core 1 made of silica-based glass, the inner cladding 2, the trench portion 3, and a part of the outer cladding 4 by the Modified Chemical Vapor Deposition (MCVD) method, then performing an outside vapor deposition to layer the remaining outer cladding 5, and finally drawing the obtained optical fiber preform in the same manner as in the normal SMF. The characteristics of the obtained low bending loss SMF 10 were measured. The results are shown in Table 7.

TABLE 7

| Item | Measurement Result |
|---|---|
| Transmission Loss (at 1310 nm) | 0.360 dB/km |
| Transmission Loss (at 1550 nm) | 0.208 dB/km |
| Cable Cut-off Wavelength | 1.21 μm |
| MFD (at 1310 nm) | 7.40 μm |
| MFD (at 1550 nm) | 8.21 μm |
| Zero-Dispersion Wavelength | 1316.5 nm |
| Zero-Dispersion Slope | 0.086 ps/nm²/km |
| Chromatic dispersion Value (1310 nm) | −0.6 ps/nm/km |
| Dispersion Slope (at 1310 nm) | 0.088 ps/nm²/km |
| Chromatic dispersion Value (1550 nm) | 16.5 ps/nm/km |
| Dispersion Slope (at 1550 nm) | 0.059 ps/nm²/km |
| RSD (at 1550 nm) | 0.0036 nm$^{-1}$ |
| Bending Loss at 1550 nm, r = 5 mm × 10 turns | 1.61 dB |
| at 1550 nm, r = 7.5 mm × 10 turns | 0.17 dB |
| at 1550 nm, r = 10 mm × 10 turns | 0.03 dB |
| at 1650 nm, r = 5 mm × 10 turns | 3.68 dB |
| at 1650 nm, r = 7.5 mm × 10 turns | 0.63 dB |
| at 1650 nm, r = 10 mm × 10 turns | 0.20 dB |

In the low bending loss SMF 10 of this example, the MFD at a wavelength of 1310 was 7.40 μm, which is lower than the range of G.652. However, the zero-dispersion wavelength was 1316.5 nm. Therefore, this satisfied the definition under G.652. The chromatic dispersion value at a wavelength of 1550 nm was 16.5 ps/nm/km, which is a value in conformance with the typical value of G.652. The bending loss produced when the fiber is wound around a 10-mm radius for 10 turns is very small, that is, 0.03 dB at a wavelength of 1550 nm. Therefore, an SMF with a very small bending loss while retaining the chromatic dispersion characteristics of G.652 was obtained.

Example 2

In this example, the low bending loss SMF according to the present invention was manufactured based on Example 6 shown in Table 1. FIG. 4 shows the refractive index profile of the low bending loss SMF 20 manufactured in this example. This low bending loss SMF 20 was manufactured by first layering the central core 1 made of silica-based glass, the inner cladding 2, the trench portion 3, and a part of the outer cladding 4 by the MCVD method, then performing an outside vapor deposition to layer the remaining outer cladding 5, and finally drawing the obtained optical fiber preform in the same manner as in the normal SMF. The characteristics of the obtained low bending loss SMF 20 were measured. The results are shown in Table 8.

TABLE 8

| Item | | Measurement Result |
|---|---|---|
| Transmission Loss (at 1310 nm) | | 0.365 dB/km |
| Transmission Loss (at 1550 nm) | | 0.212 dB/km |
| Cable Cut-off Wavelength | | 1.23 µm |
| MFD (at 1310 nm) | | 6.19 µm |
| MFD (at 1550 nm) | | 6.78 µm |
| Zero-Dispersion Wavelength | | 1306.2 nm |
| Zero-Dispersion Slope | | 0.086 ps/nm$^2$/km |
| Chromatic dispersion Value (1310 nm) | | 0.3 ps/nm/km |
| Dispersion Slope (at 1310 nm) | | 0.087 ps/nm$^2$/km |
| Chromatic dispersion Value (1550 nm) | | 16.6 ps/nm/km |
| Dispersion Slope (at 1550 nm) | | 0.053 ps/nm$^2$/km |
| RDS (at 1550 nm) | | 0.0032 nm$^{-1}$ |
| Bending Loss | at 1550 nm, r = 5 mm × 10 turns | 0.04 dB |
| | at 1550 nm, r = 7.5 mm × 10 turns | 0.00 dB |
| | at 1550 nm, r = 10 mm × 10 turns | 0.00 dB |
| | at 1650 nm, r = 5 mm × 10 turns | 0.19 dB |
| | at 1650 nm, r = 7.5 mm × 10 turns | 0.00 dB |
| | at 1650 nm, r = 10 mm × 10 turns | 0.00 dB |

In the low bending loss SMF 20 of this example, the MFD at a wavelength of 1310 was 6.19 µm, which is even lower than the MFD of Example 1. However, the zero-dispersion wavelength was 136.2 nm. Therefore, this satisfied the definition under G.652. The chromatic dispersion value at a wavelength of 1550 nm was 16.6 ps/nm/km, which is a value in conformance with the typical value of G.652.

As for the bending loss, very small values less than 0.1 dB at a wavelength of 1550 nm were obtained when the fiber was wound around not only a 10-mm radius but also around a 7.5-mm radius and a 5.0-mm radius for 10 turns. Furthermore, also at a wavelength of 1650 nm, virtually no bending loss was observed in a 10-mm radius and a 7.5-mm radius. Thus, in this example, an SMF with a very small bending loss while retaining the chromatic dispersion characteristics of G.652 was obtained.

Example 3

In the example, the low bending loss SMF according to the present invention was manufactured based on Example 6 shown in Table 1. FIG. 5 shows the refractive index profile of the low bending loss SMF 30 manufactured in this example. This low bending loss SMF 30 was manufactured by first layering the central core 1 made of silica-based glass, the inner cladding 2, the trench portion 3, and a part of the outer cladding 4 by the MCVD method, then performing an outside vapor deposition to layer the remaining outer cladding 5, and finally drawing the obtained optical fiber preform in the same manner as in the normal SMF. The characteristics of the obtained low bending loss SMF 30 were measured. The results are shown in Table 9.

TABLE 9

| Item | | Measurement Result |
|---|---|---|
| Transmission Loss (at 1310 nm) | | 0.358 dB/km |
| Transmission Loss (at 1550 nm) | | 0.205 dB/km |
| Cable Cut-off Wavelength | | 1.25 µm |
| MFD (at 1310 nm) | | 7.67 µm |
| MFD (at 1550 nm) | | 8.47 µm |
| Zero-Dispersion Wavelength | | 1309.3 nm |
| Zero-Dispersion Slope | | 0.088 ps/nm$^2$/km |
| Chromatic dispersion Value (1310 nm) | | 0.1 ps/nm/km |
| Dispersion Slope (at 1310 nm) | | 0.088 ps/nm$^2$/km |
| Chromatic dispersion Value (1550 nm) | | 17.3 ps/nm/km |
| Dispersion Slope (at 1550 nm) | | 0.060 ps/nm$^2$/km |
| RDS (at 1550 nm) | | 0.0035 nm$^{-1}$ |
| Bending Loss | at 1550 nm, r = 5 mm × 10 turns | 1.46 dB |
| | at 1550 nm, r = 7.5 mm × 10 turns | 0.14 dB |
| | at 1550 nm, r = 10 mm × 10 turns | 0.03 dB |
| | at 1650 nm, r = 5 mm × 10 turns | 3.24 dB |
| | at 1650 nm, r = 7.5 mm × 10 turns | 0.52 dB |
| | at 1650 nm, r = 10 mm × 10 turns | 0.15 dB |

In the low bending loss SMF 30 of this example, the MFD at a wavelength of 1310 was 7.67 µm, which is larger than the SMF of Example 1. The zero-dispersion wavelength was 1309.3 nm. Therefore, this satisfied the definition under G.652.. The chromatic dispersion value at a wavelength of 1550 nm was 17.3 ps/nm/km, which is a value in conformance with the typical value of G.652. The bending loss produced when the fiber is wound around a 10-mm radius for 10 turns is very small, that is, 0.03 dB at a wavelength of 1550 nm. Therefore, an SMF with a very small bending loss while retaining the chromatic dispersion characteristics of G.652 was obtained.

Example 4

In this example, the low bending loss SMF according to the present invention was manufactured based on Example 24 shown in Table 4. FIG. 6 shows the refractive index profile of the low bending loss SMF 40 manufactured in this example. This low bending loss SMF 40 was manufactured by first layering the central core 1 made of silica-based glass, the inner cladding 2 by the Vapor-phase Axial Deposition (VAD) method, then layering the outer cladding 5 by the outside vapor deposition method, and finally drawing the obtained optical fiber preform in the same manner as in the normal SMF. The characteristics of the obtained low bending loss SMF 40 were measured. The results are shown in Table 10.

TABLE 10

| Item | Measurement Result |
|---|---|
| Transmission Loss (at 1310 nm) | 0.361 dB/km |
| Transmission Loss (at 1550 nm) | 0.209 dB/km |
| Cable Cut-off Wavelength | 1.22 µm |
| MFD (at 1310 nm) | 7.90 µm |
| MFD (at 1550 nm) | 8.79 µm |
| Zero-Dispersion Wavelength | 1313.8 nm |
| Zero-Dispersion Slope | 0.086 ps/nm$^2$/km |
| Chromatic dispersion Value (1310 nm) | −0.3 ps/nm/km |
| Dispersion Slope (at 1310 nm) | 0.086 ps/nm$^2$/km |

TABLE 10-continued

| Item | | Measurement Result | |
|---|---|---|---|
| Chromatic dispersion Value (1550 nm) | | 16.4 | ps/nm/km |
| Dispersion Slope (at 1550 nm) | | 0.057 | ps/nm²/km |
| RDS (at 1550 nm) | | 0.0035 | nm⁻¹ |
| Bending Loss | at 1550 nm, r = 5 mm × 10 turns | 6.62 | dB |
| | at 1550 nm, r = 7.5 mm × 10 turns | 1.03 | dB |
| | at 1550 nm, r = 10 mm × 10 turns | 0.14 | dB |
| | at 1650 nm, r = 5 mm × 10 turns | 12.33 | dB |
| | at 1650 nm, r = 7.5 mm × 10 turns | 2.88 | dB |
| | at 1650 nm, r = 10 mm × 10 turns | 0.61 | dB |

In the low bending loss SMF 40 of this example, the MFD at a wavelength of 1310 was 7.90 μm, which is lower than the range of G.652. However, the zero-dispersion wavelength was 1313.8 nm. Therefore, this satisfied the definition under G.652. The chromatic dispersion value at a wavelength of 1550 nm was 16.4 ps/nm/km, which is a value in conformance with the typical value of G.652. The bending loss produced when the fiber is wound around a 10-mm radius for 10 turns is very small, that is, 0.14 dB at a wavelength of 1550 nm. Therefore, an SMF with a very small bending loss while retaining the chromatic dispersion characteristics of G.652 was obtained.

Example 5

In this example, the low bending loss SMF according to the present invention was manufactured based on Example 28 shown in Table 4. FIG. 7 shows the refractive index profile of the low bending loss SMF 50 manufactured in this example. This low bending loss SMF 50 was manufactured by first layering the central core 1 made of silica-based glass, the inner cladding 2, and a part of the outer cladding 4 by the MCVD method, then performing an outside vapor deposition to layer the remaining outer cladding 5, and finally drawing the obtained optical fiber preform in the same manner as in the normal SMF. The characteristics of the obtained low bending loss SMF 50 were measured. The results are shown in Table 11.

TABLE 11

| Item | | Measurement Result | |
|---|---|---|---|
| Transmission Loss (at 1310 nm) | | 0.364 | dB/km |
| Transmission Loss (at 1550 nm) | | 0.212 | dB/km |
| Cable Cut-off Wavelength | | 1.25 | μm |
| MFD (at 1310 nm) | | 6.27 | μm |
| MFD (at 1550 nm) | | 6.88 | μm |
| Zero-Dispersion Wavelength | | 1302.3 | nm |
| Zero-Dispersion Slope | | 0.087 | ps/nm²/km |
| Chromatic dispersion Value (1310 nm) | | 0.6 | ps/nm/km |
| Dispersion Slope (at 1310 nm) | | 0.085 | ps/nm²/km |
| Chromatic dispersion Value (1550 nm) | | 16.6 | ps/nm/km |
| Dispersion Slope (at 1550 nm) | | 0.053 | ps/nm²/km |
| RDS (at 1550 nm) | | 0.0032 | nm⁻¹ |
| Bending Loss | at 1550 nm, r = 5 mm × 10 turns | 2.09 | dB |
| | at 1550 nm, r = 7.5 mm × 10 turns | 0.15 | dB |
| | at 1550 nm, r = 10 mm × 10 turns | 0.01 | dB |
| | at 1650 nm, r = 5 mm × 10 turns | 5.19 | dB |
| | at 1650 nm, r = 7.5 mm × 10 turns | 0.66 | dB |
| | at 1650 nm, r = 10 mm × 10 turns | 0.08 | dB |

In the low bending loss SMF 50 of this example, the MFD at a wavelength of 1310 was 7.28 μm, which is lower than the range of G.652, but the zero-dispersion wavelength was 1302.3 nm. Therefore, this satisfied the definition under G.652. The chromatic dispersion value at a wavelength of 1550 nm was 16.6 ps/nm/km, which is a value in conformance with the typical value of G.652. The bending loss produced when the fiber is wound around a 7.5-mm radius for 10 turns is very small, that is, 0.15 dB at a wavelength of 1550 nm. Therefore, an SMF with a very small bending loss while retaining the chromatic dispersion characteristics of G.652 was obtained.

Example 6

In this example, the low bending loss SMF according to the present invention was manufactured based on Example 35 shown in Table 5. FIG. 8 shows the refractive index profile of the low bending loss SMF 60 manufactured in this example. This low bending loss SMF 60 was manufactured by first layering the central core 1 made of silica-based glass, the inner cladding 2, and a part of the outer cladding 4 by the MCVD method, then performing an outside vapor deposition to layer the remaining outer cladding 5, and finally drawing the obtained optical fiber preform in the same manner as in the normal SMF. The characteristics of the obtained low bending loss SMF 60 were measured. The results are shown in Table 12.

TABLE 12

| Item | | Measurement Result | |
|---|---|---|---|
| Transmission Loss (at 1310 nm) | | 0.363 | dB/km |
| Transmission Loss (at 1550 nm) | | 0.210 | dB/km |
| Cable Cut-off Wavelength | | 1.23 | μm |
| MFD (at 1310 nm) | | 6.27 | μm |
| MFD (at 1550 nm) | | 6.88 | μm |
| Zero-Dispersion Wavelength | | 1310.8 | nm |
| Zero-Dispersion Slope | | 0.837 | ps/nm²/km |
| Chromatic dispersion Value (1310 nm) | | −0.1 | ps/nm/km |
| Dispersion Slope (at 1310 nm) | | 0.084 | ps/nm²/km |
| Chromatic dispersion Value (1550 nm) | | 15.6 | ps/nm/km |
| Dispersion Slope (at 1550 nm) | | 0.052 | ps/nm²/km |
| RDS (at 1550 nm) | | 0.0033 | nm⁻¹ |
| Bending Loss | at 1550 nm, r = 5 mm × 10 turns | 0.09 | dB |
| | at 1550 nm, r = 7.5 mm × 10 turns | 0.00 | dB |
| | at 1550 nm, r = 10 mm × 10 turns | 0.00 | dB |
| | at 1650 nm, r = 5 mm × 10 turns | 0.39 | dB |
| | at 1650 nm, r = 7.5 mm × 10 turns | 0.02 | dB |
| | at 1650 nm, r = 10 mm × 10 turns | 0.00 | dB |

In the low bending loss SMF 60 of this example, the MFD at a wavelength of 1310 was 6.27 μm, which is lower than the range of G.652. However, the zero-dispersion wavelength was 1310.8 nm. Therefore, this satisfied the definition under G.652. The chromatic dispersion value at a wavelength of 1550 nm was 15.6 ps/nm/km, which is a value in conformance with the typical value of G.652. The bending loss produced when the fiber is wound around a 5-mm radius for 10 turns is very small, that is, 0.09 dB at a wavelength of 1550 nm. Therefore, an SMF with a very small bending loss while retaining the chromatic dispersion characteristics of G.652 was obtained.

While preferred embodiments of the present invention have been described above, these are not considered to be limitative of the invention. Addition, omission, and replacement of the constituents, and other modifications can be made without departing from the spirit or scope of the invention. The present invention is not limited by the descriptions above, but is limited only by the appended claims and their legal equivalents.

The invention claimed is:

1. A single-mode optical fiber comprising:
a central core which has a radius $r_1$ and a refractive index $n_1$;

an inner cladding which is provided around an outer circumference of the central core and has a radius $r_2$ and a refractive index $n_2$;

a trench portion which is provided around an outer circumference of the inner cladding and has a radius $r_3$ and a refractive index n3; and an outer cladding which is provided around an outer circumference of the trench portion and has a radius $r_4$ and a refractive index $n_4$, wherein:

$n_1 > n_4 \geq n_2 > n_3$, a cut-off wavelength is not greater than 1260 nm, a zero-dispersion wavelength is between 1300 nm and 1324 nm, a zero-dispersion slope is not greater than 0.093 ps/nm²/km, a mode field diameter at a wavelength of 1310 nm is between 5.5 μm and 7.9 μm, a bending loss produced if the fiber is wound around a 10-mm radius for 10 turns is not greater than 0.5 dB at a wavelength of 1550 nm, $1.5 < r_2/r_1 < 3.0$, and $0.5 < (r_3 - r_2)/r_1 < 3.0$.

2. The single-mode optical fiber according to claim 1, wherein $\Delta_1$ is a relative refractive index difference of the central core, $\Delta_2$ is a relative refractive index difference of the inner cladding, and $\Delta_3$ is a relative refractive index difference of the trench portion, and the following conditions are satisfied:

$0.40\% \leq \Delta_1 \leq 0.85\%$ $-0.20\% \leq \Delta_2 \leq 0.00\%$ $-1.0\% < \Delta_3 < \Delta_2$.

3. The single-mode optical fiber according to claim 1, wherein the radius $r_3$ of the trench portion is between 6 μm and 20 μm.

4. The single-mode optical fiber according to claim 1, wherein the radius $r_4$ of the outer cladding is between 28 μm and 64 μm.

5. A single-mode optical fiber, comprising:

a central core which has a radius $r_1$ and a refractive index $n_1$;

an inner cladding which is provided around an outer circumference of the central core and has a radius $r_2$ and a refractive index $n_2$; and an outer cladding which is provided around an outer circumference of the inner cladding and has a radius $r_4$ and a refractive index $n_4$, wherein:

$n_1 > n_4 > n_2$, a cut-off wavelength is not greater than 1260 nm, a zero-dispersion wavelength is between 1300 nm and 1324 nm, a zero-dispersion slope is not greater than 0.093 ps/nm²/km, a mode field diameter at a wavelength of 1310 nm is between 5.5 μm and 7.9 μm, and a bending loss produced if the fiber is wound around a 10-mm radius for 10 turns is not greater than 0.5 dB at a wavelength of 1550 nm.

6. The single-mode optical fiber according to claim 5, wherein $\Delta_1$ is a relative refractive index difference of the central core, $\Delta_2$ is a relative refractive index difference of the inner cladding with reference to the outer cladding, and the following conditions are satisfied:

$0.42\% \leq \Delta_1 < 0.85\%$ $1.5 \leq r_2/r_1 \leq 5.0$ $-1.0\% \leq \Delta_2 \leq -0.05\%$.

7. The single-mode optical fiber according to claim 5, wherein $y = (r_2/r_1) \cdot |\Delta_2|$, and the following conditions are satisfied:

$1.4 \cdot \Delta_1 - 0.8 \leq y \leq 1.4 \cdot \Delta_1 - 0.05$ $y \geq 0.075\%$.

8. The single-mode optical fiber according to claim 5, wherein the radius $r_2$ of the inner cladding is between 4.5 μm and 16 μm.

9. The single-mode optical fiber according to claim 5, wherein the radius $r_4$ of the outer cladding is between 28 μm and 64 μm.

* * * * *